US012340245B2

(12) United States Patent
Aristarkhov

(10) Patent No.: US 12,340,245 B2
(45) Date of Patent: Jun. 24, 2025

(54) SUBMISSION AND SYNCHRONIZATION TECHNIQUES FOR SCHEDULING AND LOAD BALANCING HARDWARE ACCELERATED TASKS ON HETEROGENEOUS PLATFORMS

(71) Applicant: Intel Corporation, Santa Clara, CA (US)

(72) Inventor: Vasily Aristarkhov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 377 days.

(21) Appl. No.: 17/642,644

(22) PCT Filed: Dec. 13, 2019

(86) PCT No.: PCT/RU2019/000941
§ 371 (c)(1),
(2) Date: Mar. 11, 2022

(87) PCT Pub. No.: WO2021/118394
PCT Pub. Date: Jun. 17, 2021

(65) Prior Publication Data
US 2022/0405128 A1 Dec. 22, 2022

(51) Int. Cl.
*G06F 9/48* (2006.01)
*G06F 9/50* (2006.01)

(52) U.S. Cl.
CPC ............ *G06F 9/4881* (2013.01); *G06F 9/485* (2013.01); *G06F 9/5044* (2013.01)

(58) Field of Classification Search
CPC .................................................. G06F 9/4881
See application file for complete search history.

(56) References Cited

U.S. PATENT DOCUMENTS

| 9,852,012 | B2 | 12/2017 | Duan et al. |
| 2009/0232413 | A1 | 9/2009 | Songhurst |
| 2009/0282413 | A1 | 11/2009 | Cialini et al. |
| 2011/0143745 | A1 | 6/2011 | Wang |
| 2012/0066683 | A1 | 3/2012 | Srinath |
| 2012/0278811 | A1 | 11/2012 | Baynast et al. |
| 2014/0115597 | A1 | 4/2014 | Schmit |

(Continued)

FOREIGN PATENT DOCUMENTS

| JP | 2003271405 A | 9/2003 |
| JP | 2008112274 | 5/2008 |

(Continued)

OTHER PUBLICATIONS

Office Action from Japanese Patent Application No. 2022-527666 notified Aug. 31, 2023, 6 pgs.

(Continued)

*Primary Examiner* — Charlie Sun
(74) *Attorney, Agent, or Firm* — Hanley, Flight & Zimmerman, LLC

(57) ABSTRACT

Techniques related to scheduling and load balancing media tasks across heterogeneous hardware units are discussed. Such techniques include estimating completion times of received media tasks and, after submission of the media task to a selected hardware, only checking status of the media task after the estimated completion time.

21 Claims, 10 Drawing Sheets

(56) References Cited

U.S. PATENT DOCUMENTS

2015/0363239 A1 12/2015 Hsu et al.
2020/0279173 A1* 9/2020 Gupta .................... G06N 5/025

FOREIGN PATENT DOCUMENTS

| | | |
|---|---|---|
| JP | 2011108140 A | 6/2011 |
| JP | 2013042548 A | 2/2013 |
| JP | 2013045248 | 3/2013 |
| JP | 2015535104 A | 12/2015 |
| WO | 2016149894 | 9/2016 |

OTHER PUBLICATIONS

Office Action from Indian Patent Application No. 202247015597 notified Jan. 31, 2023, 6 pgs.

Watabe Yutaka, Performance optimization of the FPGA offloading in OpenMP task parallel execution, Information Processing Society of Japan Report of research High performance computing (HPC), Japan, Information Processing Society of Japan, Jul. 23, 2018, 2018-HPC-165 volume, No. 25, pp. 1-7, 18 pages. [Machine Translation Included).

International Searching Authority, "International Preliminary Report on Patentability," issued in connection with International Patent Application No. PCT/RU2019/000941, mailed Jun. 23, 2022, 11 pages.

Japanese Patent Office, "Search Report by Registered Search Organization," issued in connection with Japanese Patent Application No. 2022-527666 dated Aug. 21, 2023, 54 pages. [English translation included].

Japanese Patent Office, "Written Opinion," issued in connection with Japanese Patent Application No. 2022-527666 dated Dec. 8, 2023, 5 pages. [English Translation Included].

Japanese Patent Office, "Decision to Grant a Patent," issued in connection with Japanese Patent Application No. 2022-527666 dated Dec. 19, 2023, 5 pages. [English Translation Included].

International Search Report and Written Opinion for PCT Application No. PCT/RU2019/000941, mailed Sep. 2, 2020.

Flinn, Scott, "Coordinating heterogeneous applications", Proceedings of the third ACM International Conference on Multimedia 95, Jan. 1, 1995.

Hugo, Andra-Ecaterina, et al., "Composing Multiple StarPU Applications over Heterogeneous Machines: A Supervised Approach", IEEE International Symposium on Parallel & Distributed Processing Workshops and PHD Forum, May 20, 2013.

Witt, C., et al., "Predictive Performance Modeling for Distributed Computing using Black-Box Monitoring and Machine Learning", Cornell University Library, May 30, 2018.

Intel, "Intel Media SDK", retrieved online via https://github.com/Intel-Media-SDK/MediaSDK on Feb. 18, 2022.

* cited by examiner

SUBMISSION AND SYNCHRONIZATION TECHNIQUES FOR SCHEDULING AND LOAD BALANCING HARDWARE ACCELERATED TASKS ON HETEROGENEOUS PLATFORMS

CLAIM OF PRIORITY

This Application is a National Stage Entry of, and claims priority to, PCT Application No. PCT/RU2019/000941, filed on 13 Dec. 2019 and titled "SUBMISSION AND SYNCHRONIZATION TECHNIQUES FOR SCHEDULING AND LOAD BALANCING HARDWARE ACCELERATED TASKS ON HETEROGENEOUS PLATFORMS", which is incorporated by reference in its entirety for all purposes.

BACKGROUND

In media processing contexts such as video decoding, video encoding, video transcoding, and other video processing tasks, determining an efficient scheduling policy and optimal number of central processing unit (CPU) threads for management of the media processing tasks executed by a graphics processing unit (GPU) (e.g., on execution units (EUs) or fixed function (FF) blocks) or other hardware (HW) units is important for computational efficiency and high performance Such techniques become more important as cloud based heterogeneous system on a chip (SoC) platforms become more prevalent due to the increase in the number of HW units (e.g., EUs, FF blocks, etc.) and such HW units having differing architectures (e.g., CPU, GPU, field programmable gate array (FPGA), etc.) and/or performance, quality, and power characteristics. For example, high density multisession scenarios may include thousands of concurrent tasks and, therefore, optimal scheduling and load-balancing becomes a key design consideration.

Typically, two approaches are used for synchronization of application tasks for submission to HW units, polling and blocking calls. In polling, an application thread checks the status of a submitted task periodically until it is completed. In implementation of blocking calls, an application thread waits for an event that is set from the HW unit or the software stack of the HW unit to indicate the thread is complete. Therefore, existing load-balancing techniques are based on instantaneous estimation of available resource utilization. Such scheduling approaches have limitations. Polling leads to the high CPU utilization and increasing latency between the moment when a task is executed by HW and the moment the application becomes aware of the task completion. Blocking calls require assignment of a thread for an unpredicted period of time such that an application must create enough threads to handle all actual tasks, otherwise (if the number of threads is less than the number of tasks) it may lead to the increased latency and stalls in the pipeline. Furthermore, current schedulers have difficulty finding an optimal number of CPU threads, which causes over utilization of CPU cores or undesirable latency issues.

Therefore, there is an ongoing need for efficient scheduling policies and thread management in the context of media processing as current load-balancing mechanisms fail to reach optimal resources utilization in heterogeneous media HW accelerated systems. It is with respect to these and other considerations that the present improvements have been needed. Such improvements may become critical as the desire to perform media tasks on a wide range of devices becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
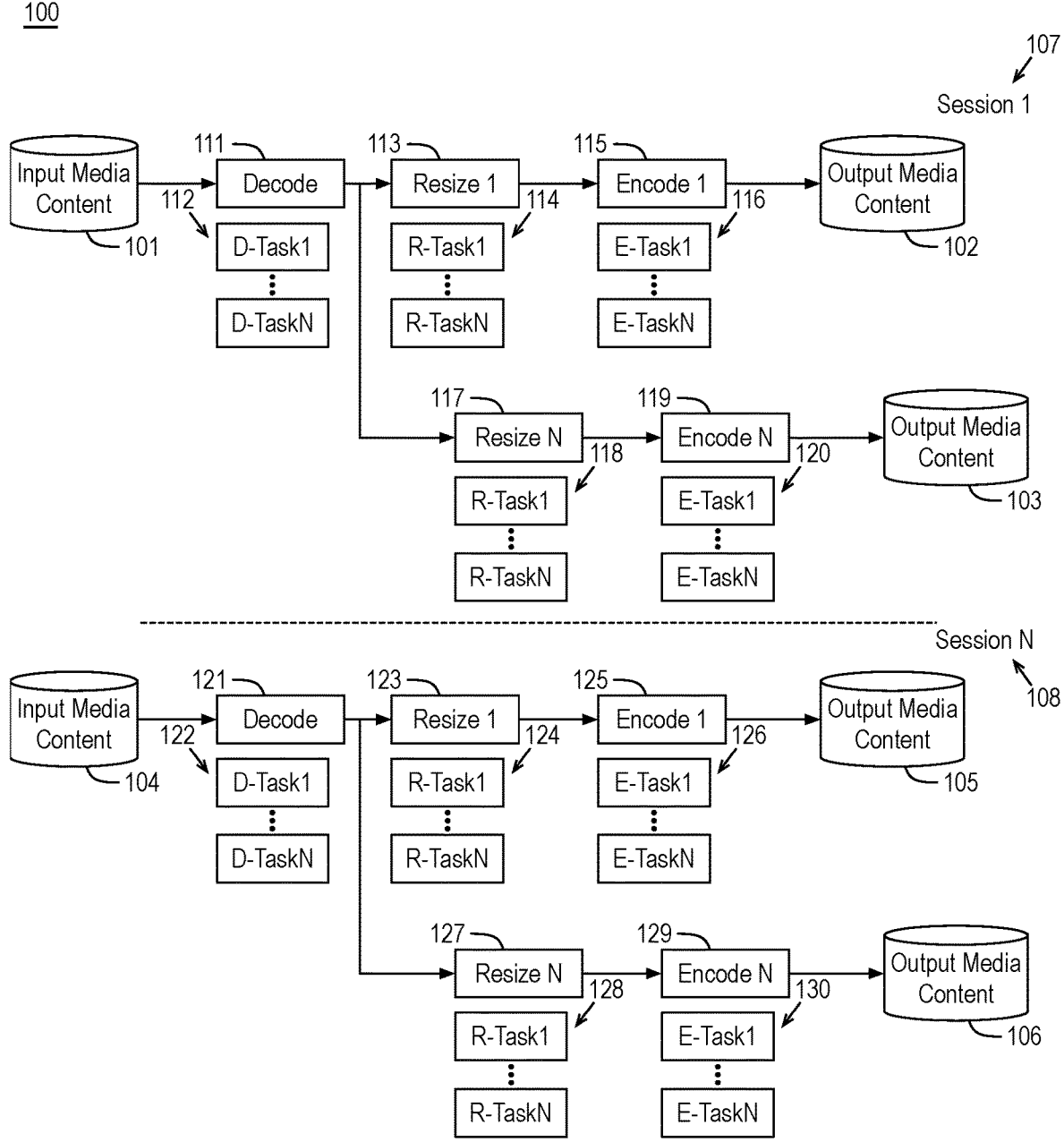
FIG. 1 illustrates an example system for processing media tasks in a heterogeneous environment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "implementation(s)", "example(s)", "embodiment(s)", etc., indicate that the implementation, example, or embodiment described may include a particular feature, structure, characteristic, or the like, but every implementation, example, or embodiment may not necessarily include the particular feature, structure, or characteristic. Moreover, such phrases are not necessarily referring to the same implementation, example, or embodiment. Further, when a particular feature, structure, or characteristic is described in connection with an implementation, example, or embodiment, it is submitted that it is within the knowledge of one skilled in the art to affect such feature, structure, or characteristic in connection with other implementations, examples, or embodiments whether or not explicitly described herein.

Methods, devices, apparatuses, computing platforms, and articles are described herein related to submission and synchronization techniques for scheduling and load balancing hardware accelerated media tasks on heterogeneous platforms including determining estimated durations for processing a media task on each hardware unit of the heterogeneous platform and using the estimated duration for assignment and management of the media task.

As described above, a media task may be processed by any one of heterogeneous hardware units in a heterogeneous platform. As used herein the term heterogeneous hardware units indicates hardware units have differing characteristics in terms of differing architectures, operational frequencies, available memory, power usage, etc. The term heterogeneous platform indicates a platform where such heterogeneous hardware units are available for processing media tasks. Such heterogeneous hardware units may include, for example, system on a chip units, graphics processing units, fixed function blocks, execution units, etc. Notably, the heterogeneous hardware units may have differing architectures, core processing units, etc. and may be implemented in a heterogeneous system architecture such that media tasks may be submitted to any of the heterogeneous hardware units for processing. Such hardware units may also be characterized as functional blocks, functional units, operational blocks, operational units, engines, etc. In some embodiments, each hardware unit is a separate monolithic integrated circuit. As used herein, the term monolithic integrated circuit indicates a number of circuits integrated onto a shared substrate. Such monolithic integrated circuits may each be attached to a motherboard and/or interconnected. As used herein, the term media task indicates any task or subtask related to processing media content including video or images. Exemplary media tasks include video encode tasks, video decode tasks, frame or image resizing tasks, etc.

In some embodiments, an estimated duration for processing a received media task is determined at each of the heterogeneous hardware units. The estimated durations may be based on a priori information (e.g., reference data, model experiments, simulations, emulations, etc.) specific to each of the heterogeneous hardware units. In addition or in the alternative, the estimated durations may also be based on previous media task durations such that durations of media tasks of the same type on the same or the same type of hardware unit are recorded and used to determine or adjust the estimated duration. In addition to the estimated durations, other characteristics of the processing on each heterogeneous hardware unit may be determined, such as estimated memory usage, estimated power usage, etc. Furthermore, the cost of changing hardware units may be taken into account when selecting the hardware unit. For example, the duration of copying information for the media task and/or memory transaction costs may be taken into account when selecting the hardware unit for the media task.

The estimated duration and/or other characteristics are used to determine which of the heterogeneous hardware units is selected for the media task. In some embodiments, the heterogeneous hardware unit having the lowest duration is selected. In other embodiments, other factors such as estimated memory usage and estimated power usage are used in addition or in the alternative to the estimated duration. For example, the hardware unit with the lowest memory usage or power usage or the lowest linear combination of duration, memory usage, and power usage may be selected. After selection, the media task is submitted to the selected hardware unit for processing and the submission time is recorded. Using the submission time and the estimated duration (e.g., by adding the estimated duration to the submission time), an estimated completion time for the task is generated. Thereafter, the status of the media task is not checked on (e.g., using polling techniques) nor scheduled for reply by the hardware unit (e.g., using a blocking call) until the estimated completion time passes. Furthermore, the media task is then only checked on in response to the estimated completion time being triggered (e.g., immediately upon triggering or after a short delay).

Using such techniques, the polling operations and blocking call operations are advantageously avoided. For example, use of blocking calls requires use of a single thread to manage each submitted media task, which provides too many threads. In a blocking call, an instruction is provided to the hardware unit to have the hardware unit provide an output at completion of the media task. For each blocking call, a separate thread is required to monitor hardware unit for the output. Notably, each thread is managed by the CPU and high thread usage takes up CPU bandwidth that may be advantageously allocated to other user or application tasks. Notably, a thread is the smallest sequence of programmed instructions that can be managed by a scheduler of an operating system. In polling operations, the CPU polls for the status of the hardware unit at a predetermined interval until the hardware unit indicate the media task processing is complete, which requires inefficient CPU usage.

By avoiding blocking call operations and polling operations during the estimated duration of the media task, more efficient CPU usage is provided due to optimizing the number of threads and eliminating unneeded polling operations. For example, the number of threads may be reduced as multiple media tasks that are separated temporally may be assigned to the same thread. Notably, the thread can manage multiple media tasks across heterogeneous hardware units since it does not need to be dedicated to one hardware unit due to a blocking call. Furthermore, polling operations are eliminated or largely eliminated, which frees up the CPU to perform other critical tasks.

The disclosed techniques provide an approach to submit media tasks to hardware (e.g., media fixed function blocks on a GPU, separate GPUs, field programmable gate arrays, etc.) to optimize CPU scheduling, dynamically find an optimal number of CPU threads, and provide improved load balancing. In some embodiments, a scheduler (e.g., middleware) queries low-level software (e.g., hardware drivers) to determine an estimated duration and/or other characteristics for a media task. Based on this information, the middleware makes a decision about submission of the task to a selected hardware unit. The media task is submitted to the selected hardware unit and the CPU asynchronously takes results (e.g., media task output data) using the expected task duration, for example, by determining an expected completion time and only checking status of the media task after the expected completion time has passed. For example, a system timer may be set at the expected completion time and the status check may be triggered by the system timer at the expected completion time.

Such techniques provide advantages including improved timing, power consumption, and memory consumption and improved prediction of such timing, power consumption, and memory consumption using tasks descriptions (e.g., what is type of workload such as decode or video processing or encode, characteristics such as resolution, etc.) and a priori information about duration of such workloads on hardware units as is discussed further herein. The disclosed techniques allow minimization of the number of threads operating on a CPU loading, decrease latency associated with CPU stack layers, and efficient load-balancing on the heterogeneous systems with many media hardware units.

FIG. 1 illustrates an example system 100 for processing media tasks in a heterogeneous environment, arranged in accordance with at least some implementations of the present disclosure. As shown in FIG. 1, system 100 may implement any number of sessions 107, 108 such as a first session 107, any number of additional sessions, and an Nth session 108. Furthermore, in each session input media content is received and processed to generate output media content. System 100 may be implemented via any suitable device or group of devices such as, for example, a server, a cloud computing resource, a personal computer, a laptop computer, a tablet, a phablet, a smart phone, a digital camera, a gaming console, a wearable device, a display device, an all-in-one device, or the like or platform such as a server platform or a mobile platform or the like. For example, as used herein, a system, device, computer, or computing device may include any such device or platform.

For example, in first session 107, input media content 101, such as an encoded bitstream, is received and processed to generate output media content 102, such as an encoded bitstream (representative of video at a different resolution and/or a bitstream in another format), and output media content 103, such as an encoded bitstream (representative of video at yet a different resolution and/or a bitstream in another format). Furthermore, in Nth session 108, input media content 104, such as an encoded bitstream, is received and processed to generate output media content 105, such as an encoded bitstream (representative of video at a different resolution and/or a bitstream in another format), and output media content 106, such as an encoded bitstream (representative of video at yet a different resolution and/or a bitstream in another format). Although illustrated with respect to transcoding in the context of video resizing, sessions 107, 108 may perform any media content processing such as video encode, video decode, etc.

Also as shown, within each of sessions 107, 108, high level operations or software components may be broken into media tasks or processes that are performed by heterogeneous hardware units. For example, first session 107 may include a decode component 111 that breaks a decode operation or process into multiple decode tasks 112, a resize component 113 that breaks a resize operation or process into multiple resize tasks 114, an encode component 115 that breaks an encode operation or process into multiple encode tasks 116, a resize component 117 that breaks a resize operation or process into multiple resize tasks 118, and an encode component 119 that breaks an encode operation or process into multiple encode tasks 120. Such media tasks 112, 114, 116, 118, 120 may be any suitable subtasks for the higher level tasks or operations such as frame encode, frame decode, motion vector search, color conversion, denoise, color adjustment, frame resizing, bitstream parsing, forward quantization, forward transform, inverse quantization, inverse transform, motion compensation, intra prediction, sub-sampling, frame interpolation, motion estimation, adaptive filtering, and so on. As used herein, the term media task indicates any such subtask. For example, each subtask may operation on a frame of video, a slice of video, a largest coding unit of video, etc. and may benefit from acceleration using a hardware unit specialized at least in part for the subtask.

Similarly, Nth session 108 may include a decode component 121 that breaks a decode operation or process into multiple decode tasks 122, a resize component 123 that breaks a resize operation or process into multiple resize tasks 124, an encode component 125 that breaks an encode operation or process into multiple encode tasks 126, a resize component 127 that breaks a resize operation or process into multiple resize tasks 128, and an encode component 129 that breaks an encode operation or process into multiple encode tasks 130. Such media tasks 122, 124, 126, 128, 130 may be any suitable subtasks for the higher level tasks or operations as discussed with respect to first session 107. As discussed, system 100 may perform any number of sessions 107, 108 at least partially in parallel.

For example, system 100 may implement an over the top (OTT) media service that operates with multiple sessions 107, 108. Each of sessions 107, 108 may operate in an adaptive bit-rate (ABR) mode with any number of concurrent media components (e.g., decode, encode, video processing) working on one or several processes that may reach hundreds of media tasks. For example, each of components 111, 113, 115, 117, 119, 121, 123, 125, 127, 129 may be characterized as a software component with each providing software functionality. Each component submits tasks (e.g., video frames, video slices, etc.) to hardware units (e.g., GPU, FPGA, any other media architecture). Typically, video applications require 60 frames per second with minimum latency, which corresponds to thousands of tasks associated with each video frame that are handled by CPU threads. Advantageously, the discussed techniques minimize overall CPU loading to allow use of the CPU by end user applications that need CPU resources. Furthermore, as discussed, heterogeneous platforms have different hardware units to perform media tasks such that scheduling and managing such media tasks by the CPU is an important consideration.

Figure 2:
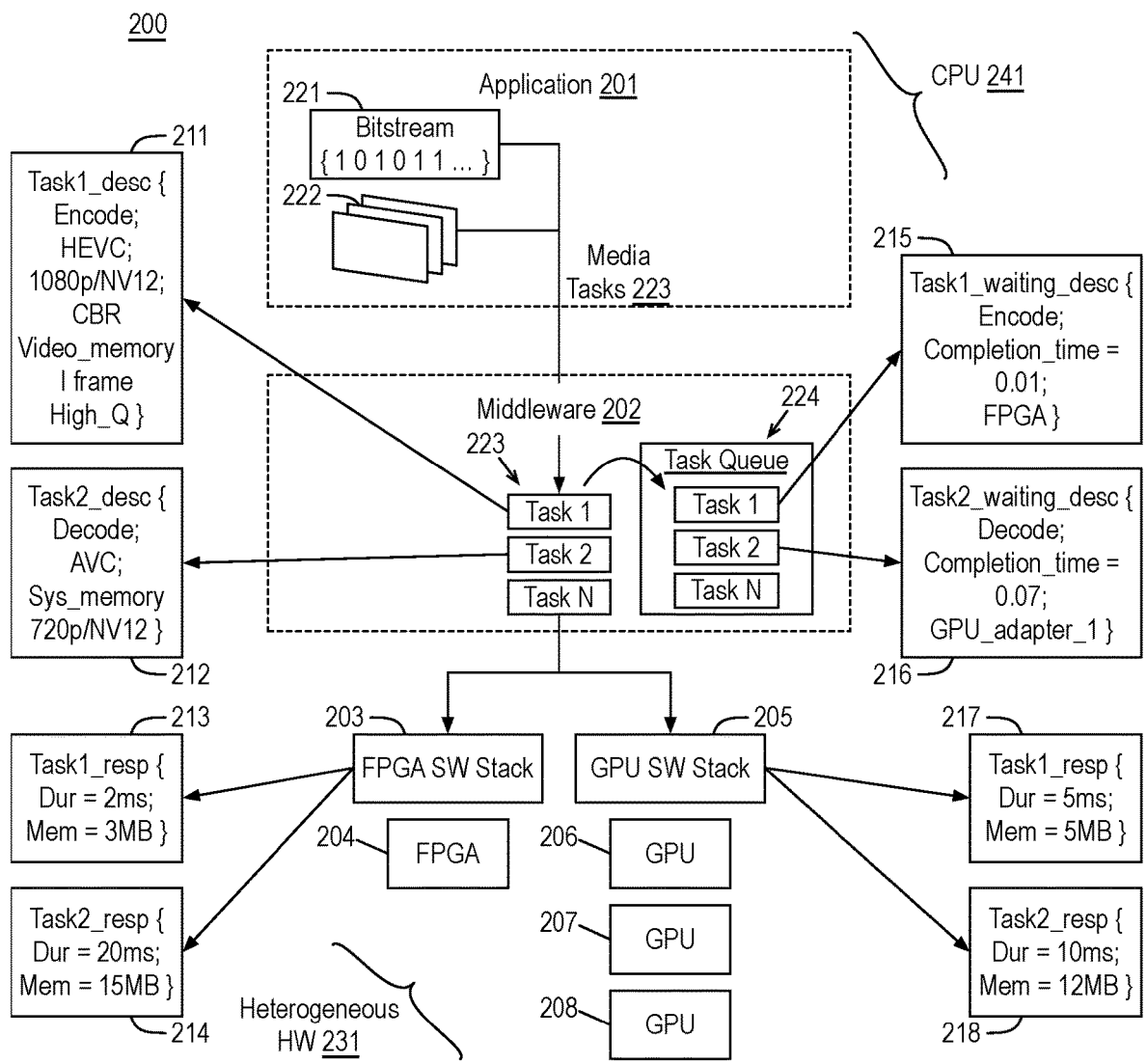
FIG. 2 illustrates an example system for processing media tasks using characteristics for the media tasks and corresponding hardware units.

FIG. 2 illustrates an example system 200 for processing media tasks using characteristics for the media tasks and corresponding hardware units, arranged in accordance with at least some implementations of the present disclosure. As shown in FIG. 2, system 200 includes a CPU 241, which implements an application 201 (or application layer) and middleware 202, and heterogeneous hardware units 231. CPU 241 may include any number and types of central processing units or controllers. Heterogeneous hardware units 231 may include any number and types of media hardware units such as graphics processing units (GPU), portions of GPUs (e.g., functional blocks of a GPU), execution units (EUs), fixed function (FF) blocks, image processors, video processors, etc. CPU 241 and heterogeneous hardware units 231 may be implemented in whole or in part in the same housing and/or on the same motherboard or CPU 241 and heterogeneous hardware units 231 may be implemented across different devices. In some embodiments, CPU 241 and heterogeneous hardware units 231 are implemented in a server environment on the same or different server racks or modules. Furthermore, CPU 241 and heterogeneous hardware units 231 may communicate using any suitable technique or techniques. As with system 100, system 200 may be implemented via any suitable device or group of devices such as those listed with respect to system 100.

As shown, application 201 receives or generates media data 221, 222 (input media content) to be processed to generate output data (output media content). For example, application 201 may receive or generate a media software component for processing such as component 221 (e.g., a bitstream of video data for decode), component 222 (e.g., video frames for encode or resizing), and so on. Application 201, as discussed with respect to FIG. 1, may segment components 221, 222, which may be characterized as software components, into media tasks 223. Media task 223 are provided to middleware 202 for processing. Notably, application 201 submits media task 223, including input media data, and receives output media data (not shown). Media tasks 223 include media data to be processed and descriptive data or instruction data indicative of how the media data is to be processed. For example, the media data may be a bitstream, video sequence, etc. (e.g., a payload) and the descriptive data indicates the task to be performed (e.g., decode, encode, etc.) and the specifications of the task to be performed and/or specifications of the media data for performance of the task.

For each media task 223 from application 201, middleware 202 determines an estimated duration and/or other characteristics. For example, as shown with respect to media task 1 and media task 2 of N media tasks 223 submitted from application 201 to middleware 202, each task may have a corresponding task descriptor. For example, media task 1 has a task descriptor 211 including task information, descriptors, indicators, or the like that characterize media task 1. Such information or descriptors may include, as shown with respect to task descriptor 211, a task type descriptor (e.g., encode), a task standard descriptor (e.g., High Efficiency Video Coding (HEVC)), a task resolution descriptor (e.g., 1080p), a task color space descriptor (e.g., NV12), a task bitrate type descriptor (e.g., constant bitrate (CBR), a memory type descriptor (e.g., video memory), a frame type descriptor (e.g., I frame), and a coding quality descriptor (e.g., high quality, High_Q). Similarly, media task 2 has a corresponding task descriptor 212 including a task type descriptor (e.g., decode), a task standard descriptor (e.g., Advanced Video Coding (AVC)), a memory type descriptor (e.g., system memory), a task resolution descriptor (e.g., 720p), and a task color space descriptor (e.g., NV12). In the illustrated embodiment, task descriptor 211 indicates media task 1 is to encode, based on the HEVC codec, an I frame of 1080p video in the NV12 color space using a constant bitrate and high quality. Such information may indicate an encode profile or other settings to be employed by a hardware unit during processing. Similarly, task descriptor 212 indicates decode of an AVC compliant bitstream to generate 720p video (e.g., a slice, frame, or sequence of video) in the NV12 color space.

As used herein, a media task descriptor includes any data structure indicative of the process to be used to perform the media task including, as discussed, task type descriptors, task standard descriptors, task resolution descriptors, task color space descriptors, task bitrate type descriptors, memory type descriptors, frame type descriptors, coding quality descriptors, etc. Notably, a media task descriptor may be any information (outside of the data to be processed itself) that is required for performance of the media task.

Based on task descriptor 211, middleware 202 determines corresponding task response 213 for a first hardware unit, FPGA 204, and corresponding task response 213 for a second hardware unit, any of GPU engines 206, 207, 208. That is, for a media task and based on a task descriptor, middleware 202 determines a task response for hardware units. In the example of FIG. 2, two hardware unit types, FPGA 204 and GPU engines 206, 207, 208 with a total of four available hardware units are illustrated. However, system 200 may have any number and types of hardware units. For each hardware unit (or type if multiple hardware units of the same type are employed), a corresponding task response is generated.

In the context of the illustrated example, therefore, media task 1 and task descriptor 211 cause the determination of two task responses 213, 217 such that task response 213 corresponds to the expected response if media task 1 were submitted to FPGA 204 for processing and task response 217 corresponds to the expected response if media task 1 were submitted to any of GPU engines 206, 207, 208 for processing. Similarly, media task 2 and task descriptor 212 cause the determination of two task responses 214, 218 such that task response 214 corresponds to the expected response if media task 1 were submitted to FPGA 204 for processing and task response 218 corresponds to the expected response if media task 1 were submitted to any of GPU engines 206, 207, 208 for processing. As discussed, for each of media tasks 223, a number of task responses are generated equal to the number of available types of hardware resources.

Task responses 213, 214, 217, 218 may include any data or data structures indicative of expected resource usages during implementation of the media task at the hardware unit. In the illustrated embodiment, each of task responses 213, 214, 217, 218 indicates an expected duration of the media task (e.g., 2 ms, 20 ms, 5 ms, and 10 ms, respectively) and an expected memory allocation of the media task (e.g., 3 MB, 15 MB, 5 MB, and 12 MB, respectively). In some embodiments, task responses 213, 214, 217, 218 include an expected power usage.

Middleware 202 may determine task responses 213, 214, 217, 218 using any suitable technique or techniques. In some embodiments, as illustrated, middleware 202 accesses low level software or firmware of each of heterogeneous hardware units 231 to determine task responses 213, 214, 217, 218. For example, middleware 202 may access FPGA software stack 203, which runs on or interfaces with FPGA 204 to determine task responses 213, 214 and/or middleware 202 may access GPU software stack 205, which runs on or interfaces with GPU engines 206, 207, 208 to determine task responses 217, 218. For example, for each media task 223 from application 201, middleware 202 may determine task responses 213, 214, 217, 218 using low-level functionality such as FPGA software stack 203 and GPU software stack 205.

In some embodiments, middleware 202 may have a priori information or data regarding each media task and each of heterogeneous hardware units 231 including, for example, reference data from model experiments, simulations, emulations, etc. For example, middleware 202 may parameterize a task descriptor and access a task response via a look up table, determine a task response from an approximation function, or the like. In addition or in the alternative, middleware 202 may store previous task response and use them to determine a current task response. For example, for a particular task descriptor any number of previous durations, memory usages, or power usages may be stored and an average, a median, rolling average, or other representative value may be provided for the task responses. In some embodiments, such previous task response data may be used to modify a priori information to determine the current task response. For example, the a priori information and previous actual task responses may be averaged or otherwise combined to determine the current task response. Other techniques, such as look ahead analysis may also be used, as is discussed further herein below.

Using task responses 213, 214, 217, 218, middleware 202 determines which of heterogeneous hardware units 231 are to implement media tasks 223. Middleware 202 may determine which of heterogeneous hardware units 231 are to implement media tasks 223 using any suitable technique or techniques. In an embodiment, middleware 202 selects the hardware unit of heterogeneous hardware units 231 having a corresponding minimum duration. In an embodiment, media task 1 is assigned to FPGA 204 in response to media task 1 having a shorter expected duration on FPGA 204 (2 ms) than on GPU engines 206, 207, 208 (5 ms). Similarly, media task 2 may be assigned to one of GPU engines 206, 207, 208 (to be managed by GPU software stack 205) in response to media task 2 having a shorter expected duration on one of GPU engines 206, 207, 208 (10 ms) than on FPGA 204 (20 ms).

In other embodiment, one of heterogeneous hardware units 231 may be selected based on a corresponding minimum of memory usage or power consumption. In an embodiment, one of heterogeneous hardware units 231 may be selected based on a corresponding minimum of a linear combination of any of expected duration, memory usage, and power consumption. For example, a score may be generated for each of heterogeneous hardware units 231 as a sum of a first factor times the expected duration, a second factor times the memory usage, and a third factor times the power consumption (e.g., Score=x1*DUR+x2*MEM+x3*POW) and a hardware unit corresponding to the minimum score is selected.

In some embodiments, the cost of changing hardware units may be taken into account when selecting the hardware unit such that the cost is part of the discussed characteristics (duration, memory, power) or an additional characteristics. For example, the duration, memory usage, and/or power consumption of copying information for the media task when transferring data for a media task that is dependent on data from a prior media task may be taken into account. In the context of decode or encode, for example, there are dependencies from previous tasks (e.g., reference data) such that when selecting a hardware unit for processing, the duration, memory usage, and/or power consumption (e.g., cost) of selecting a hardware unit that performed a prior media task may be less than that of selecting a different hardware unit (although the second hardware unit may have a lower duration, memory usage, and/or power consumption without the need of such data transfer). For example, in the context of encode media tasks, a GPU engine (e.g., first hardware unit) may be selected for encode of I and P frames of a video sequence. Thereafter, an application may request encode of a B frame in the sequence, which, absent the need to copy and transfer reference data (e.g., frames, collocated motion vectors, etc.) may have a lowest cost using an FPGA (e.g., a second hardware unit). However, when copy and transfer of reference data costs are taken into account, the GPU engine (e.g., first hardware unit) may have a lower cost and may be selected for the encode of B frame media task. In some embodiments, the discussed duration, memory usage, power consumption, and other task responses may include such copy and transfer of reference data costs. In some embodiments, the copy and transfer of reference data costs are added to duration, memory usage, power consumption, and other task responses as discussed herein.

After selection of one of heterogeneous hardware units 231 for processing of a media task, the media task is submitted to the selected hardware unit for processing. Furthermore, the submission time and the expected duration may be stored. In the example of FIG. 2, media task 1 may be first submitted to FPGA 204 and media task 2 may be subsequently submitted to one of GPU engines 206, 207, 208. Based on the submission time and the expected duration, an estimated completion time of each media task is generated. In an embodiment, the estimated completion time is the submission time plus the expected duration. Furthermore, each submitted media task 223 are marked or flagged as waiting to complete and stored in a task queue 224 in the order of expected completion time. Task queue 224 may be implemented via any suitable memory structure for example.

As shown, when stored in task queue 224, each of media tasks 223 has a corresponding in process descriptor such that media task 1 has a corresponding in process descriptor 215 and media task 2 has a corresponding in process descriptor 216. In process descriptors 215, 216 may have any suitable data structure indicating an indication of an expected completion time for the media task. In the embodiment of FIG. 2, in process descriptor 215 includes a task type descriptor (e.g., encode), a completion time (e.g., 0.01), and a hardware unit descriptor (e.g., FPGA) indicating the selected hardware unit to which media task 1 was submitted for processing. Similarly, in process descriptor 216 includes a task type descriptor (e.g., decode), a completion time (e.g., 0.07), and a hardware unit descriptor (e.g., GPU engine 1) indicating the selected hardware unit to which media task 2 was submitted for processing.

Each of media tasks 223 is also assigned to a thread (not shown) implemented by CPU 241. Each of media tasks 223 may be assigned to an existing thread or a new thread may be generated for the media task. As discussed, due to not implementing a blocking call for a media task, the number of threads implemented by CPU 241 may be drastically reduced. For example, implementation of a blocking call requires that a single thread be used for the media task. In contrast, using the discussed techniques, multiple media tasks may be handled by the same thread. In some embodiments, completion times of adjacent media tasks are evaluated. In some embodiments, if a current media task (e.g., media task 2) has the same completion time as a previous media task (e.g., media task 1), a restriction is applied such that the media tasks may not be provided to the same thread. It is noted that the same thread may be used (e.g., the media task may be assigned to the same thread, but increased latency and/or pipeline stalls may be caused. In some embodiments, a second thread is generated in response to the current media task having the same completion time with respect to the previous media task. In some embodiments, a second thread is generated in response to the current media task having the same completion time with respect to the previous media task only if another thread is not available. In some embodiments, when N media tasks have the same completion times, N corresponding threads are created. Although discussed with respect to the completion times matching, in some embodiments, the completion times may not need to match but only need to be within a threshold (e.g., 0.01 ms) of each other for a new thread to be generated.

In addition or in the alternative, a new thread may be generated for a current media task (e.g., media task 2) when latency times for processed media tasks increases above a threshold or when latency times are increasing. For example, the latency corresponds to a time difference between a time the output media data is provided or reported to the requesting application and the estimated completion time. In some embodiments, each latency time is compared to a threshold and a new thread is generated when any latency time exceeds the threshold. In other embodiments, an average latency time, a median latency time, a rolling average latency time, a temporally median filtered latency time, or the like may be used in place of a single latency time. Furthermore, in some embodiments, changes in latency time over time is monitored such that if latency times increase a new thread is added. For example, if a difference between a latency time measure (one latency time, an average of latency times, etc.) at a second time instance subsequent to a first time instance is greater than a threshold (indicating increase in latency), a thread may be added. In some embodiments, a rate of change in the latency time measure is compared to a threshold and, if exceeding the threshold, a thread is added.

As discussed, the current media task (e.g., media task 2) is assigned to a thread (a previously existing thread or a newly generated thread) for management of the media task. Between the submission time and the estimated completion time, the thread does not communicate in any manner with the assigned hardware unit (or any intervening software used to manage the assigned hardware unit). For example, with reference to FIG. 2, media task 2 may be assigned to GPU engine 206. Between the submission time and the estimated completion time, middleware does not communicate with any of GPU software stack 205, GPU engines 206, 207, 208, or any other software, firmware, or hardware corresponding to any of heterogeneous hardware units 231.

In an embodiment, the thread managing media task 2 operating on middleware 202 starts a system timer to provide a trigger at the completion time indicated by in process descriptor 216. Prior to the trigger from the system timer, the thread as implemented by middleware 202 does not query or check the status of media task 2. Only after and in response to the trigger, the thread as implemented by middleware 202 to manage media task 2 provides a status check to GPU software stack 205 (or directly to one of GPU engines 206, 207, 208) to check the status of media task 2. In an embodiment, the thread as implemented by middleware 202 makes a status call to the low level software or firmware driver corresponding to the hardware unit processing media task 2. Although discussed with respect to media task 2 for the sake of clarity of presentation, such processing may be performed with respect to any of media tasks 1 to N.

In response to the status check, the pertinent hardware unit or software or firmware driver for the hardware unit, responds either with the resultant output media data or an indicator the media task is not complete. Notably, due to the accuracy of the estimated duration, a high proportion (at or near 100%) of status checks will result in the output media data being provided in response to the status check. If so, the output media data (e.g., encoded bitstream, video slice, frame, sequence, etc.) is provided to application 201 by middleware 202.

If not, middleware 202 may employ polling or a blocking call for the media task. In polling, middleware 202 provides a status check at a particular time interval (e.g., every 0.05 ms or 0.1 ms or the like). For use of a blocking call, middleware 202 provides an instruction call to the low level driver of the hardware unit instructing the low level driver (e.g., GPU software stack 205) to provide an indication as to when the media task is complete.

After the discussed processing, the operations (receive media task including task descriptor, determining task response, assigning and submitting media task to a hardware unit, determining estimated completion time and submission of media task to task queue, assigning the media task to a previous or new thread, the thread foregoing communication with the hardware unit until the estimated completion time, and outputting the resultant output media data) are repeated for any number of received media tasks.

Discussion now turns to look ahead analysis for media tasks to determine a selected hardware unit and/or an estimated completion time.

Figure 3:
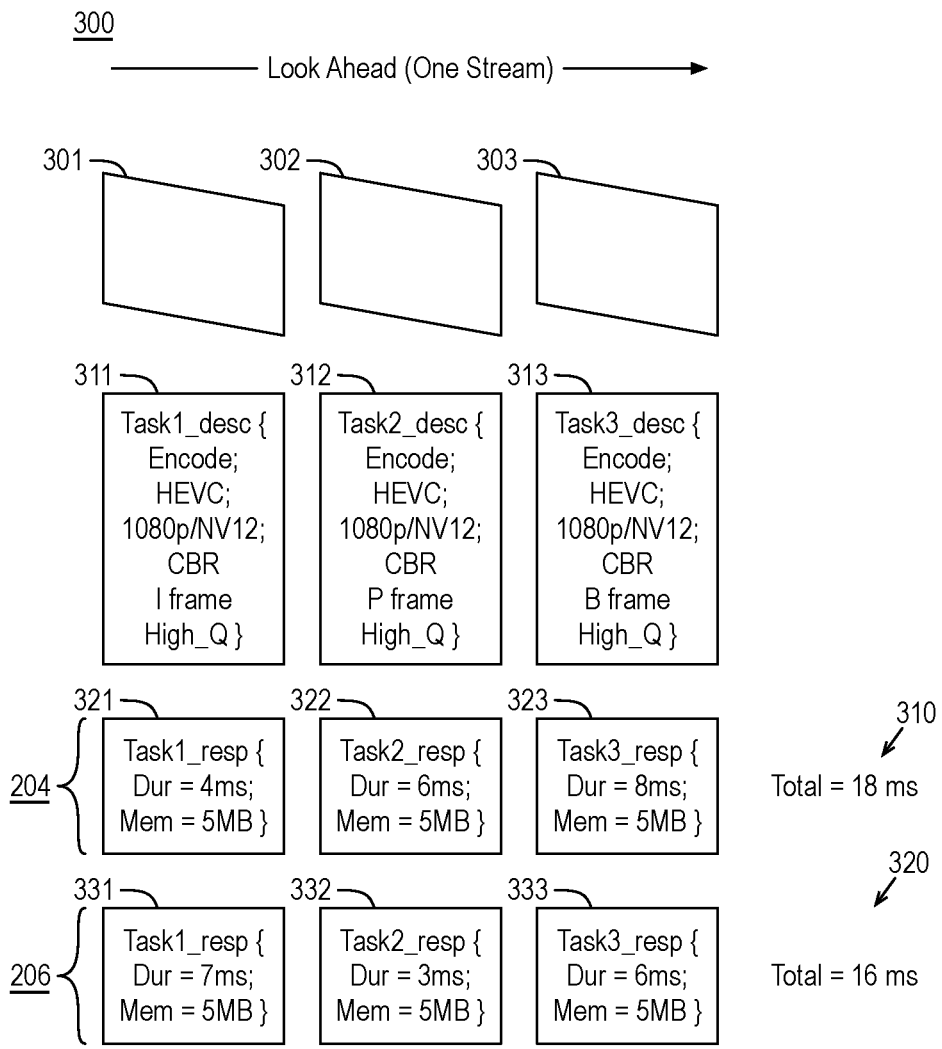
FIG. 3 illustrates an example look ahead analysis for use in processing media tasks.

FIG. 3 illustrates an example look ahead analysis 300 for use in processing media tasks, arranged in accordance with at least some implementations of the present disclosure. As shown, look ahead analysis 300 may include determining a series of task responses 321, 322, 323 corresponding to task descriptors 311, 312, 313 for processing frames 301, 302, 303, respectively. Notably, task responses 321, 322, 323 may each correspond to performing media tasks (not shown) corresponding to task descriptors 311, 312, 313 on FPGA 204. Similarly, task responses 331, 332, 333 are generated such that each corresponds to performing media tasks (not shown) corresponding to task descriptors 311, 312, 313 on GPU engine 206 (or any of GPU engines 206, 207, 208). Although illustrated with respect to FPGA 204 and GPU engine 206, task descriptors 311, 312, 313 may be generated for any number and types of heterogeneous hardware units as discussed herein.

For example, task descriptor 311 indicates encode using HEVC of a 1080p resolution I frame in the NV12 color space using constant bitrate and high quality, task descriptor 312 indicates encode using HEVC of a 1080p resolution P frame in the NV12 color space using constant bitrate and high quality, and task descriptor 313 indicates encode using HEVC of a 1080p resolution B frame in the NV12 color space using constant bitrate and high quality. As shown, FPGA 204 has an estimated duration for the media task corresponding to task descriptor 311 of 4 ms, an estimated duration for the media task corresponding to task descriptor 312 of 6 ms, and an estimated duration for the media task corresponding to task descriptor 313 of 8 ms, as indicated by task responses 321, 322, 323. As shown, the estimated durations may be summed to generate a total estimated duration 310 of 18 ms for FPGA 204. Similarly, estimated durations for the media tasks of 7 ms, 3 ms, and 6 ms for GPU engine 206 are summed to generate a total estimated duration 320 of 16 ms for GPU engine 206.

Notably, in some embodiments, middleware 202 may assign the media tasks corresponding to task descriptors 311, 312, 313 to the same hardware unit of heterogeneous hardware units 231 based on the hardware unit having a minimum total estimated duration with respect to all hardware units of heterogeneous hardware units 231. For example, some media tasks may be grouped and a total estimated duration for the group may be determined for each of heterogeneous hardware units 231. The hardware unit corresponding to the minimum total estimated duration is then selected for each of the media tasks of the group. Although discussed with respect to minimum total estimated duration, minimum total memory usage, minimum total power consumption, or a combination thereof may also be used.

In other embodiments, a media task, such as an encode task includes a look ahead analysis task that provides information and/or statistics for a subsequent full task. For example, a look ahead analysis may include performing the same task on very low resolution video (e.g., a low resolution motion vector search), performing task(s) to gain information or statistics about a video frame (e.g., spatial complexity, temporal complexity, etc.) prior to full encode or other processing. In the context of encode, such information may be used to enable or disable particular aspects of encode (e.g., limit intra modes, limit coding or transform partitioning, enable or disable deblock filtering, etc.), to provide coding structure (e.g., determine a frame type for the frame), etc. In the context of estimation duration as discussed herein, such information may be used to modify an a priori estimated duration. For example, look ahead processing may be performed for a media task to generate one or more look ahead processing parameters. The look ahead processing may be the same type but with different characteristics (e.g., motion search on lower resolution), different than the media task, or for the sake of gathering information about the media (e.g., frame), as discussed. In any case, the estimated duration for the media task may be based on the look ahead processing parameters or response.

For example, for video frame encode, a look ahead processing parameter indicating a high spatial complexity may be used to increase an estimated duration. Similarly, a look ahead processing parameter indicating a high temporal complexity may be used to increase an estimated duration. In some embodiments, the completion duration for the look ahead analysis is used to adjust the estimated duration for the media task. For example, the completion duration for the look ahead analysis may be divided by an expected duration and the resultant factor may be multiplied by the estimated duration for the media task to determined a final estimated duration for the media task.

Discussion now turns to thread management by CPU 241. As discussed, in some embodiments, a new thread may be generated in response to a current media task.

Figure 4:
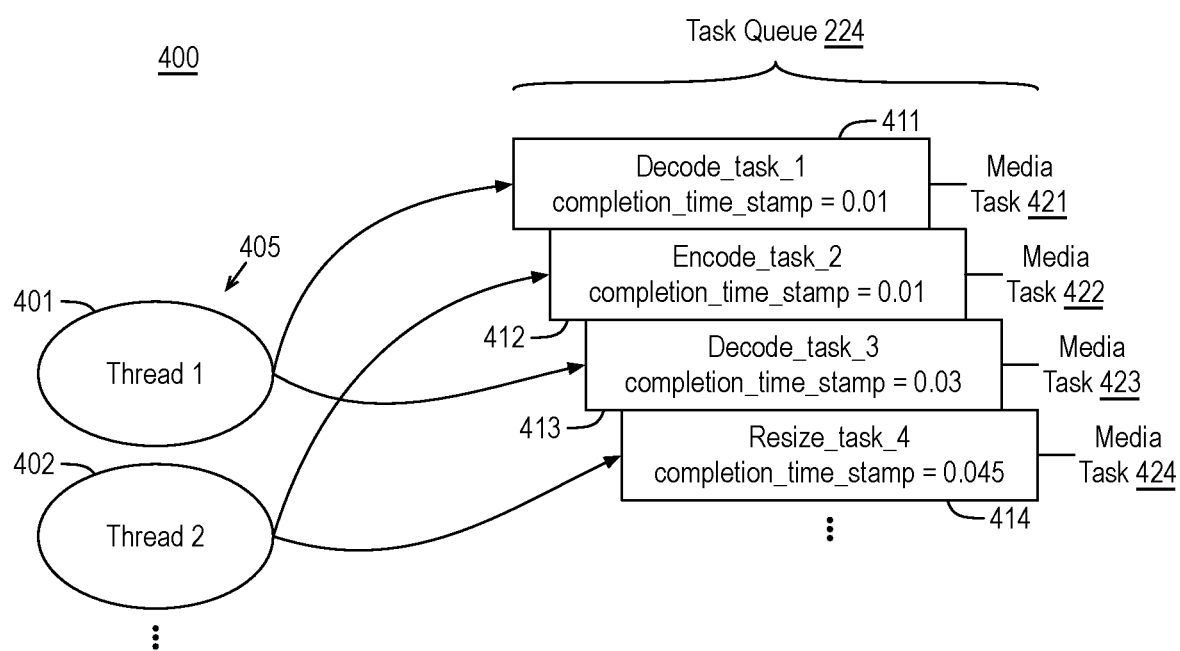
FIG. 4 illustrates exemplary thread management for use in managing submitted media tasks.

FIG. 4 illustrates exemplary thread management 400 for use in managing submitted media tasks, arranged in accordance with at least some implementations of the present disclosure. As shown, a media task 421 corresponding to an in process descriptor 411 (e.g., a descriptor of media task 421 having been submitted to task queue 224 as discussed herein) is assigned to a first thread 401 of threads 405 for management of media task 421. In the illustrated example, media task 421 is a decode having an expected completion time of 0.01 (e.g., completion_time_stamp). In some embodiments, multiple threads may be initiated with each waiting for a first available media task to reduce potential latency in a start up phase. The number of threads may then be managed over time as discussed herein.

Furthermore, a media task 422 immediately following media task 421 in task queue 224 corresponds to an in process descriptor 412, a media task 423 immediately following media task 421 in task queue 224 corresponds to an in process descriptor 413, and a media task 424 immediately following media task 423 in task queue 224 corresponds to an in process descriptor 414. In the illustrated example, media task 422 is an encode task having an expected completion time of 0.01, media task 423 is a decode task having an expected completion time of 0.03, and media task 424 is a resize task having an expected completion time of 0.045.

Notably, media task 421 and media task 422 have the same expected completion time of 0.01. In response to media task 421 and media task 422 having the same expected completion time, a second thread 402 is generated to manage media task 422. For example, first thread 411 may not be able to manage both media task 421 and media task 422 due to having to call the corresponding hardware units at the same time and/or an expectation that first thread 411 may need to enter a blocking call (and therefore be able to only handle one thread) if media task 421 is not ready when first thread 411 checks on media task 421. In the illustrated embodiment, second thread 402 is generated in response to the completion times of media tasks 421, 422 being the same. In some embodiments, second thread 402 is generated in response to the completion times of media tasks 421, 422 being within a threshold of one another such as 0.01 ms or 0.005 ms. As used herein the term being within a threshold of one another indicates the difference between the values (or the absolute value of the difference) is less than the threshold or less than or equal to the threshold.

Also as shown, the completion time of media task 423 is not equal to the completion time of media task 422 and not within a threshold such as 0.01 ms of the completion time of media task 422. Therefore, no new thread is needed for media task 423. Furthermore, media task 423 is assigned to first thread 401. For example, when no new thread is needed, media tasks may be assigned in a sequential manner across the available threads. Similarly, the completion time of media task 424 is not equal to the completion time of media task 423 and not within a threshold such as 0.01 ms of the completion time of media task 422. Therefore, no new thread is needed for media task 424 and media task 424 is assigned to second thread 402.

In some embodiments, in addition or in the alternative to comparing expected completion times as discussed, the number of threads 405 employed by middleware 202 may be adjusted based on media task latencies. For example, at assignment of each or any of media tasks 421, 422, 423, 424, at completion of each or any of media tasks 421, 422, 423, 424, at regular intervals, or even sporadically, latencies for previous media tasks may be evaluated. For example, as used herein with respect to a media task, the term latency indicates a difference between an estimated completion time and an actual completion time (as indicated by the corresponding media output data being provided to application 201). Based on one or more such latencies, the number of threads 405 may be managed. For example, a latency time measure equal to a single latency, an average of latencies, a median of latencies, a running average, or the like may be compared to a threshold. If the latency time measure exceeds the threshold, the number of threads 405 is increased.

Similarly, if the latency time measure is below the threshold or another threshold (less than the first threshold), a thread may be eliminated to reduce the number of threads. In other embodiments, the change in latency over time is analyzed such that, if the latency change or rate of change exceeds a threshold, a new thread is added.

As discussed, simply increasing threads comes at the cost of disadvantageously consuming more of the CPU and a balance of the number of threads needs to be found. For example, middleware 202 may adjust the number of working threads 405 by checking the delta or latency determined as a time difference between a completion_time_stamp (estimated completion time) of a media task and a time when task was executed as measured by when corresponding output media data are provided to application 201. A stable delta or latency indicates the number of threads 405 is optimal. If the delta or latency is growing (as measured by a difference of deltas or latencies at different times exceeding a threshold or a rate of change of the deltas or latencies exceeding a threshold), the number of threads 405 is increased, as discussed. Notably, such techniques distinguish overall underperformance issues (e.g., when hardware units cannot process media tasks with required speed) versus CPU exhaustion (e.g., when middleware does not create and run enough threads or does not give enough computation time to handle the tasks).

Figure 5:
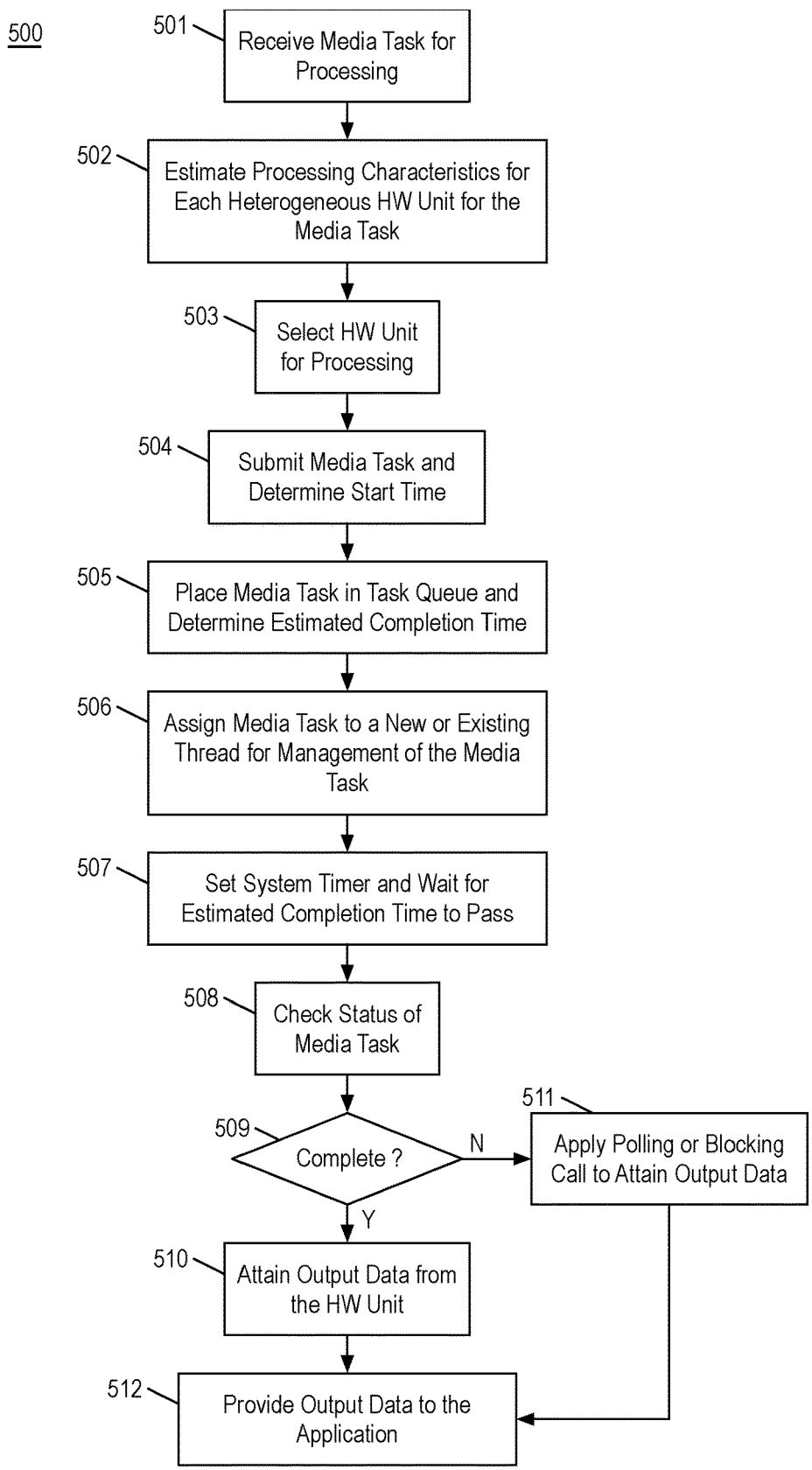
FIG. 5 is a flow diagram illustrating an example process for scheduling media tasks based on estimated processing characteristics.

FIG. 5 is a flow diagram illustrating an example process 500 for scheduling media tasks based on estimated processing characteristics, arranged in accordance with at least some implementations of the present disclosure. Process 500 may include one or more operations 501-512 as illustrated in FIG. 5. Process 500 or portions thereof may be performed by any device or system discussed herein. For example, process 500 may be implemented by a CPU such as by middleware running on a CPU. Process 500 or portions thereof may be repeated for any number of media tasks, media processing sessions, or the like.

As shown, process 500 begins at operation 501, where a media task is received from an application for processing. The media task may be any media task discussed herein and may be part of a set of media tasks needed to generate a media output or a stand alone media task. Furthermore, the media task may include or be coupled to a task descriptor including task information, descriptors, indicators, etc. that characterize the media task for processing.

Processing continues at operation 502, where processing characteristics are determined for the media task for each of any number of heterogeneous hardware units. For example, if a system includes N heterogeneous hardware units or N types of heterogeneous hardware units (with some of the N types having redundancy), N processing characteristics are generated for the media task. The processing characteristics may include any data discussed herein such as estimated processing duration, estimated memory usage, estimated power consumption, etc. Techniques for determining processing characteristics for the media task are discussed further herein with respect to FIG. 6.

Processing continues at operation 503, where one of the N heterogeneous hardware units or N types of heterogeneous hardware units are selected for processing the media task. For example, a particular one of the heterogeneous hardware units may be selected or particular type of the heterogeneous hardware units may be selected and, if a type is selected, a controller may be used to particular hardware unit of the type or the particular hardware units may be selected in a sequential fashion or based on availability. In some embodiments, the hardware unit or type is selected based on the hardware unit or type corresponding to a minimum expected duration. In some embodiments, the hardware unit or type is selected based on the hardware unit or type corresponding to a minimum of a score for the media task such as a weighted sum of factors and the expected duration, the expected memory usage, and the expected power consumption.

Processing continues at operation 504, where the media task is submitted to the hardware unit selected at operation 503. The media task may be submitted using any suitable technique or techniques. In an embodiment, operations 501-504 are performed by middleware operating on a CPU and operation 504 includes the middleware operating on the CPU submitting the media task to the selected hardware unit using an interface to a low level driver (e.g., software or firmware) of the selected hardware unit. Furthermore, at operation 504, a start time of the media task is determined. For example, the start time may be reported from the low level driver of the hardware unit to indicate start processing of the media task. In some embodiments, the start time is part of or determined using a time stamp as provided by the low level driver of the hardware unit for the media task.

Processing continues at operation 505, where the media task is placed in a task queue (e.g., local to the middleware) and an estimated completion time is determined for the media task. In an embodiment, the estimated completion time is the start time as determined at operation 504 plus an expected duration determined at operation 502. In some embodiments, the estimated completion time is stored as part of an in process descriptor or record for the media task as stored in the task queue.

Processing continues at operation 506, where the media task is assigned to a thread that runs on the CPU and manages the media task. In some embodiments, the media task is assigned to an existing thread. In some embodiments, a new thread is generated and the media task is assigned to the new thread. Techniques for assigning the media task to a thread of the CPU are discussed further herein with respect to FIG. 7.

Processing continues at operation 507, where a system timer is set for the media task and, until the estimated completion time has passed, the thread does not check status of the media task as processed by the selected hardware unit. For example, the thread managing the media task may set a system timer to indicate passing of the estimated completion time. Although discussed with respect to setting a system timer, the thread may track the estimated completion time using any suitable technique or techniques. Through the estimated completion time (and after submission of the media task to the hardware unit), the thread does not provide any communication to the hardware unit (e.g., to low level drivers of the hardware unit, directly to the hardware unit, etc.). For example, the thread and the hardware unit may be considered communicatively decoupled during that time as the thread does not poll or check status of the hardware unit and the thread has not issued a blocking call (so the hardware unit will not respond upon completion of the media task). Notably, during that time, no data or indicators are communicated between the thread (e.g., the CPU) and the hardware unit. Furthermore, as discussed, a status check is performed after passing of the estimated completion time. It is noted that in the case of a blocking call, no such status check is performed. Such communicative decoupling has advantages as discussed herein including freeing the CPU up to perform other tasks (as it is not performing polling during processing of the media task) and not requiring the thread remain dedicated only to the media task at hand. For example, due to not issuing a blocking call, another media task may be assigned to the thread during the processing of the media task.

Processing continues at operation 508, where only after and in response to passing the estimated completion time as determined at operation 505, the status of the media task is checked. In an embodiment, after and in response to passing the estimated completion time, the thread (as implemented by middleware of the CPU) issues a status check to the low level driver of the hardware unit or the hardware unit itself. The status check may include any suitable data structure to check status such as those employed in polling operations, an indicator or indicators requesting resultant data for the media task, or the like.

Processing continues at decision operation 509, where a determination is made as to whether the media task has completed processing on the hardware unit. For example, in response to the status check, the hardware unit may respond with the resultant data for the media task, if available, or an indicator the media task is not complete. If the task is complete, processing continues at operation 510, where the resultant data for the media task, as discussed, is attained from the hardware unit. If not, processing continues at operation 511, where the thread applies polling (e.g., checking status of the hardware unit intermittently) or a blocking call to attain the resultant data for the media task. As discussed, implementation of operation 511 may be rare due to the accuracy of the estimated completion time. In either case, processing continues at operation 512 (from operation 510 or 511), where the resultant data for the media task (e.g., output data) is provided to the application using any suitable technique or techniques.

Process 500 may be repeated for each received media task for improved scheduling, improved CPU and hardware unit usage efficiency, and for improved thread management.

Figure 6:
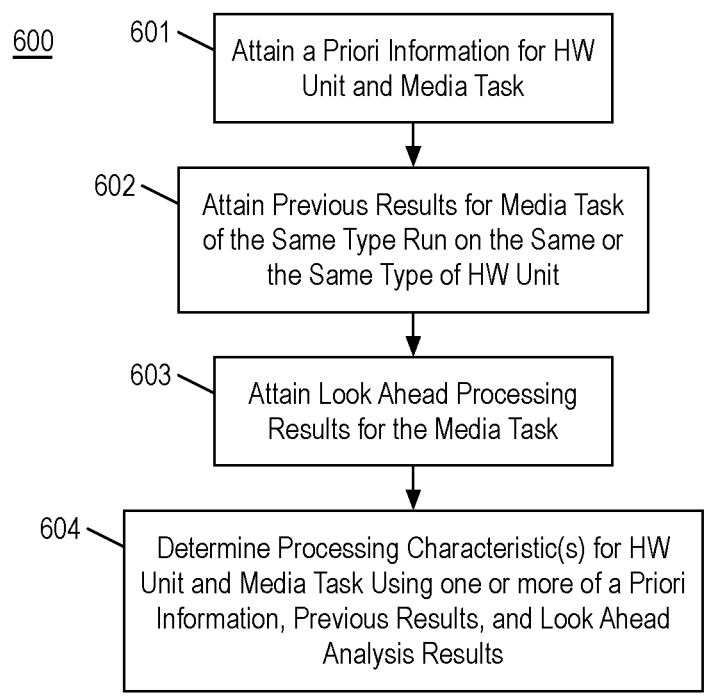
FIG. 6 is a flow diagram illustrating an example process for determining processing characteristics for a media task.

FIG. 6 is a flow diagram illustrating an example process 600 for determining processing characteristics for a media task, arranged in accordance with at least some implementations of the present disclosure. Process 600 may include one or more operations 601-604 as illustrated in FIG. 6. Process 600 or portions thereof may be performed by any device or system discussed herein. For example, process 600 may be implemented at operation 502 of process 500. Process 600 or portions thereof may be repeated for any number of media tasks, media processing sessions, or the like.

As shown, process 600 begins at operation 601, where a priori information for a particular hardware unit or type of hardware unit and a received media task are received. The a priori information is indicative of processing characteristics for a particular media task to be processed on a particular hardware unit or type of hardware unit. For example, based on the design, architecture, and characteristics of a particular hardware unit or type of hardware unit, the expected processing characteristics (e.g., duration, memory usage, power consumption, etc.) may be determined using any suitable technique or techniques. Such techniques may include a priori experiments (e.g., C-model experiments), modeling, and emulations that may be adjusted according to hardware and/or platform specific characteristics such as operational frequency, graphics processor or engine type, and so on. Such a priori information may be stored and accessed using any suitable techniques and data structures including look up tables, modeling functions, etc.

Process 600 continues at operation 602, where previous results for processing media tasks of the same type as the current media task on the same or same type of hardware unit may be attained. For example, middleware as running on a CPU may attain and store a sampling of prior processing characteristics from running media tasks of the same type as the current media task on the same or same type of hardware unit. Such processing characteristics may include any processing characteristics as discussed herein including duration (e.g., difference between start time and completion time on the same or same type of hardware unit). For example, media tasks may be parameterized (e.g., provided parameters indicative of the type of media task as discussed) and for each parameterization and hardware unit (or hardware unit type) pairing, one or more records of resultant processing characteristics may be stored. In some embodiments, a single instance of processing characteristics results are stored while, in other embodiments, multiple instances may be stored or an average of such multiple instances may be maintained.

Process 600 continues at operation 603, where look ahead processing results may be attained. For example, some media tasks have corresponding look ahead operations that are used to inform processing of the media task. For example, frame statistics or look ahead encode may be performed prior to encoding of a video frame to identify the frame type for the frame, enable or disable modes for the frame, or otherwise inform the resultant encode. Such look ahead results may be leveraged to modify or adjust the processing characteristics for the media task. For example, for a frame encode (or slice encode or motion vector search, etc.), look ahead analysis indicating high temporal complexity (e.g., frame temporal distortion exceeding a threshold) may be used to increase one or more of the processing characteristics such as increasing the expected duration. Similarly, indicators of high spatial complexity may increase one or more of the processing characteristics such as increasing the expected duration.

Process 600 continues at operation 604, where final processing characteristics for the media task are determined using one or more of the a priori information, the previous results, and the look ahead analysis results. In an embodiment, only the a priori information is used such that the processing characteristics may be looked up or determined based on the media task characteristics. In some embodiments, only previous results are used such that the processing characteristics are determined from stored previous processing characteristics results.

In some embodiments, the a priori information processing characteristics and the previous results processing characteristics may be blended to determine the final processing characteristics. For example, the a priori information and the previous results may be averaged. In an embodiment, the a priori information may be adjusted based on previous results such that the final processing characteristics are a sum of the a priori information and a product of the previous results and a scaling factor that is between zero and one (e.g., $final\_PC = a\_priori\_PC + SF*previous\_PC$). Furthermore, the processing characteristics generated using the a priori information processing characteristics and the previous results processing characteristics may be adjusted based on look ahead analysis information as discussed with respect to operation 604.

Process 600 may be repeated for each received media task and each heterogeneous hardware unit or type of heterogeneous hardware unit to attain accurate processing characteristics and, notably, an accurate estimated processing duration, for each heterogeneous hardware unit or type of heterogeneous hardware unit for the media task for use in assigning the media task to a selected heterogeneous hardware unit or selected type of heterogeneous hardware unit and for management, via a thread, of the assigned media task.

Figure 7:
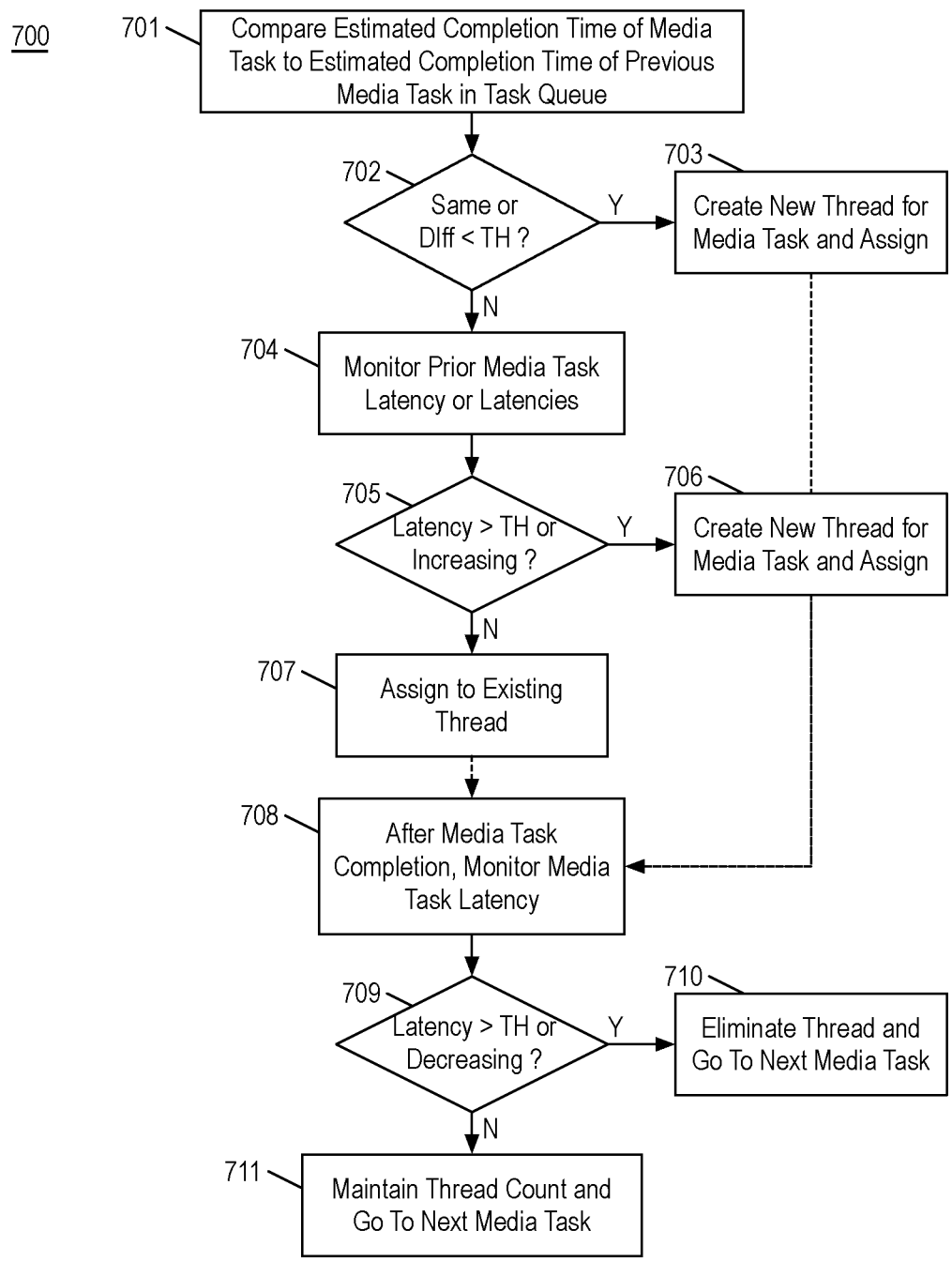
FIG. 7 is a flow diagram illustrating an example process 700 for assigning a media task to a thread.

FIG. 7 is a flow diagram illustrating an example process 700 for assigning a media task to a thread, arranged in accordance with at least some implementations of the present disclosure. Process 700 may include one or more operations 701-711 as illustrated in FIG. 7. Process 700 or portions thereof may be performed by any device or system discussed herein. For example, process 600 may be implemented at operation 506 of process 500. Process 700 or portions thereof may be repeated for any number of media tasks, media processing sessions, or the like.

As shown, process 700 begins at operation 701, where, for a current media task, the estimated completion time of the media task is compared to an estimated completion time of a previous media task in a task queue. The previous media task may be any previous media task. In examples where only one thread is being employed, the previous media task may be an immediate previous media task in the queue. In example where multiple threads are being employed, the previous media task may be a task for a thread to which the current media task is to be assigned.

Processing continues at decision operation 702, where a determination is made as to whether the completion times of the current media task and the previous media task match or are within a threshold of one another. In some embodiments, the determination is made based on the completion times matching exactly (to a level of precision or granularity provided by the system) and processing continues at operation 703 only upon a match. In other embodiments, the determination is made based on the completion times being within a threshold of one another. For example, the completion times may be differenced and, if the difference or an absolute value of the difference, is less than the threshold, processing continues at operation 703.

If the completion times match or are within a threshold of one another, processing continues at operation 703, where a new thread may be generated for the media task and the media task is assigned to the new thread. As discussed, in some embodiments, the media task may be assigned to the existing thread, but latency and/or throughput may be affected. For example, indications of matching or very close completion times may require or indicate the need for increased threads. By increasing the number of threads, the current media task may be properly managed as discussed and future media tasks are less likely to have a matching or close completion time with a previous media task previously assigned to a thread. The number of threads may be increased by any number such as by a single thread as shown.

If the completion times do not match or are not within a threshold of one another, processing continues at operation 704, where prior media task latencies may be monitored. As used herein, the term latency indicates the time between the estimated completion time of a media task and report of the resultant output data to the application (e.g., the execution time). Therefore, the latency may include not just any delay in the processing at the selected heterogeneous hardware unit or inaccuracy in the estimated completion time but also delays in the management of the media tasks by the CPU, which may be indicative of a need to increase the number of threads employed. As shown, the processing of previous media tasks may be monitored to determine such processing latencies.

Processing continues at decision operation 705, where a determination is made as to whether a latency measure exceeds a threshold or if the latency measure is increasing over time. The latency measure may include a single latency or any suitable combination of latencies. For example, all or a sampling of previous latencies may be averaged or a median (or other measure such as a rolling average or filtered median) may be used to generate the latency measure for evaluation. In some embodiments, the latency measure is compared to a threshold latency, and if the latency measure exceeds the threshold latency, processing continues at operation 706. In addition or in the alternative, the latency measure may be monitored over time to detect increases in the latency measure over time (e.g., a rate of change of the latency measure). The rate of change may be determined using any suitable technique or techniques. For example, a first latency measure at a first time instance and a second latency measure at a second time instance may be determined such that the second time instance is subsequent to the first time instance. The rate of change of latency may then be determined as a difference of the latency measures divided by the difference in time (e.g., Rate=(LM2−LM1)/(T2−T1)). If the rate of change exceeds another threshold, processing continues at operation 706.

As shown, when decision operation 705 determines latency and/or rate of change in the latency exceeds a threshold and/or necessitates creation of one or more new threads, process 700 continues at operation 706, where a new thread is generated for the media task and the media task is assigned to the new thread. If no new thread was generated at operations 703, 706, processing continues at operation 707 where the media task is assigned to an existing thread and no new thread or threads are generated. As discussed, the media task may be assigned to a new thread by sequentially selecting a next thread of all threads in operation.

Processing continues at operation 708 from any of operations 703, 706, or 707. At operation 708, after completion of the media task, media task latency may again be monitored. Such monitoring is shown after task completion but may be performed at after any suitable number of tasks are complete, after any duration, etc. As discussed with respect to operation 704, the media task latency of the just completed media task and/or any prior media task latencies may be monitored. As used herein, the term latency indicates the time between the estimated completion time of a media task and report of the resultant output data to the application (e.g., the execution time).

Processing continues at decision operation 709, where a determination is made as to whether a latency measure is less than a threshold or if the latency measure is decreasing over time. Such determinations may be made in analogy to those discussed with respect to decision operation 705. For example, the latency measure may include a single latency corresponding to the just completed media task or any suitable combination of latencies including an average, a median, a rolling average, a filtered median. As shown, the latency measure is compared to a threshold latency, and if the latency measure is less than the threshold latency, processing continues at operation 710. In addition or in the alternative, the rate of change of latency may be determined, as discussed above, and, if the rate of change is less than another threshold, processing continues at operation 710.

At operation 710, where one or more threads may be eliminated in response to the determination made at decision operation 709. In some embodiments, the eliminated thread is the thread of the just processed media task either immediately or after completion of any other media tasks assigned to thread.

If no thread is to be eliminated, processing continues at operation 711, where the number of threads is maintained and a next media task is processed. Process 700 may be repeated for each received media task and/or at various intervals for thread management. Notably, process 700 maintains a balance in the number of threads to enable efficient processing of media tasks and CPU availability for other tasks.

Figure 8:
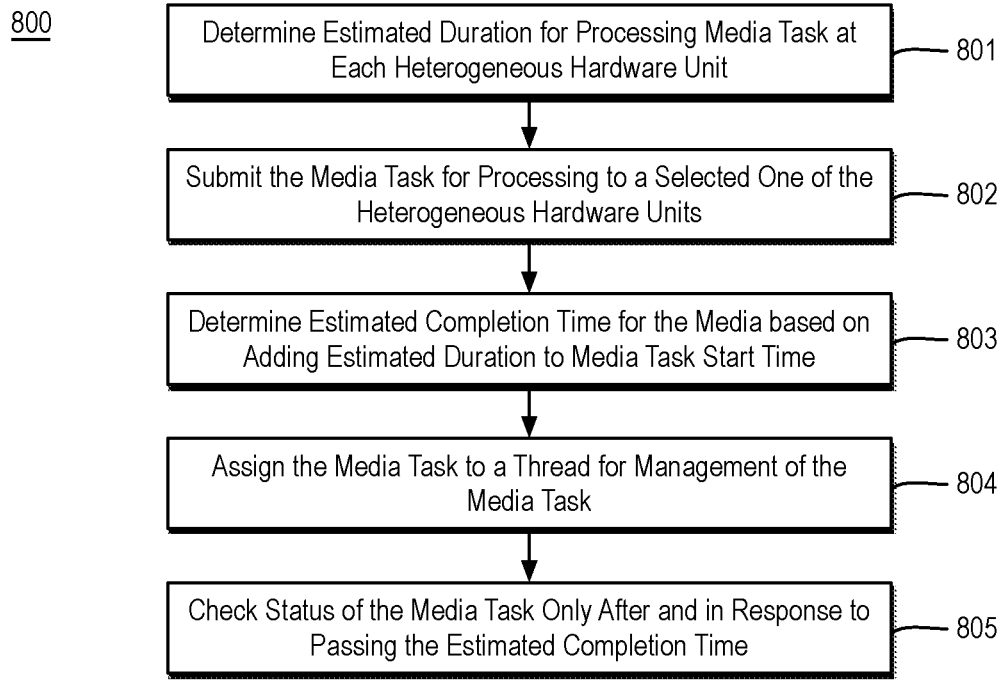
FIG. 8 is a flow diagram illustrating an example process for scheduling media tasks.

FIG. 8 is a flow diagram illustrating an example process 800 for scheduling media tasks, arranged in accordance with at least some implementations of the present disclosure. Process 800 may include one or more operations 801-805 as illustrated in FIG. 8. Process 800 may form at least part of a media task scheduling process. By way of non-limiting example, process 800 may form at least part of a media task scheduling process as performed by any device or system as discussed herein. Furthermore, process 800 will be described herein with reference to system 900 of FIG. 9.

Figure 9:
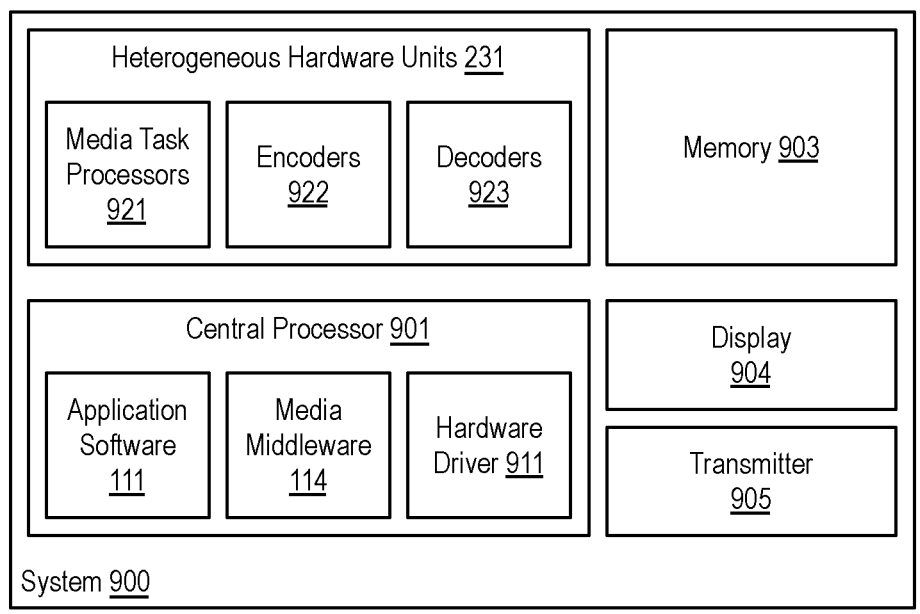
FIG. 9 is an illustrative diagram of an example system for scheduling media tasks.

FIG. 9 is an illustrative diagram of an example system 900 for scheduling media tasks, arranged in accordance with at least some implementations of the present disclosure. As shown in FIG. 9, system 900 may include a central processor 901, any number of heterogeneous hardware units 231, memory 903, a display 904, and a transmitter 905. Also as shown, central processor 901 may include or implement application 201, middleware 202, and a hardware driver 911 for interfacing with heterogeneous hardware units 231. Furthermore, heterogeneous hardware units 231 may implement media task processors 921 (for resizing, encode, decode, filtering, or any other media tasks), encoders 922, decoders 923, and any other components or processes discussed herein. In the example of system 900, memory 903 may store media task data or related content such as video frames, bitstream data, task descriptor data, task response, in process descriptor, and/or any other data as discussed herein.

As shown, in some examples, application 201, middleware 202, and hardware driver 911 may be implemented via central processor 901. In other examples, one or more portions of application 201, middleware 202, and a hardware driver 911 may be implemented via another central processor or controller. Furthermore, as shown, in some examples, media task processors 921, encoders 922, decoders 923 may be implemented via heterogeneous hardware units 231. In other examples, media task processors 921, encoders 922, decoders 923 or portions thereof may be implemented via or another processing unit such as dedicated hardware.

Heterogeneous hardware units 231 may include one or more graphics processors, which may include any number and type of graphics processing units that may provide the operations as discussed herein. Such operations may be implemented via software or hardware or a combination thereof. For example, a graphics processor may include circuitry dedicated to manipulate video frames, video data, image data, bitstream data, or the like obtained from memory 903. Central processor 901 may include any number and type of processing units or modules that may provide control and other high level functions for system 900 and/or provide any operations as discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 903 may be implemented by cache memory.

In an embodiment, heterogeneous hardware units 231 may include execution units (EU) of a graphics processor or other processor. The EU may include, for example, programmable logic or circuitry such as a logic core or cores that may provide a wide array of programmable logic functions. In an embodiment, heterogeneous hardware units 231 may include dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 8, process 800 begins at operation 801, where an estimated duration for processing a received media task at each of multiple heterogeneous hardware units is determined. For example, for each hardware unit, an estimated duration is determined. In addition to the estimated duration, other task response characteristics such as estimated memory usage and estimated power consumption may be determined. In some embodiments, the media task is one of a frame encode, a frame decode, a motion vector search, a color conversion, a denoise, a color adjustment, or a frame resizing. In some embodiments, the heterogeneous hardware units include each of a graphics processing unit, a fixed function hardware block, an execution unit, and a system on a chip.

In some embodiments, determining the estimated durations is based on a task description corresponding to the media task and, for each of the multiple heterogeneous hardware units, a priori reference data corresponding to the task description. In some embodiments, determining the estimated durations includes determining a previous execution time for processing a second media task having the same type as the media task at the selected one of the heterogeneous hardware units and setting the estimated duration for the selected one of the heterogeneous hardware units based at least in part on the previous execution time. In some embodiments, determining the estimated durations includes performing look ahead processing on the media task to generate one or more look ahead processing parameters for the media task such that the look ahead processing performs the same task as the media task with one or more differing processing characteristics and setting the estimated duration based at least in part on the look ahead processing parameters.

Processing may continue at operation 802, where the media task is submitted for processing to a selected one of the heterogeneous hardware units based on the estimated durations. As discussed, in some embodiments, the selected one of the heterogeneous hardware units corresponds to the hardware unit having the minimum estimated duration. In some embodiments, the selected one of the heterogeneous hardware units corresponds to the hardware unit having a minimum score generated as a weighted sum of an estimated duration and one or more other task response characteristics such as memory usage and power consumption. In some embodiments, submitting the media task for processing to the selected one of the heterogeneous hardware units includes selecting the selected one of the heterogeneous hardware units in response to the selected one of the heterogeneous hardware units having a minimum estimated duration of the estimated durations.

Processing may continue at operation 803, where an estimated completion time for the media task is determined based on adding the estimated duration corresponding to the selected one of the heterogeneous hardware units to a start time corresponding to the media task submission. As discussed below, the estimated completion time may be used to manage the media task and a number of threads operating for management of multiple media tasks.

Processing may continue at operation 804, where the media task is assigned to a thread for management of the media task. In some embodiments, assigning the media task to the thread includes determining the estimated completion time for the media task is within a threshold of a second estimated completion time for a second media task assigned to a second thread and creating the thread in response to the estimated completion time being within the threshold of the second estimated completion time. In some embodiments, assigning the media task to the thread includes determining the estimated completion time for the media task matches a second estimated completion time for a second media task and assigned to a second thread and creating the thread in response to the estimated completion time being within the threshold of the second estimated completion time. In some embodiments, process 800 further includes determining a third estimated completion time for a third media task is after the estimated completion time and a fourth estimated completion time for a fourth media task is after the third estimated completion time, wherein the third media task is immediately subsequent to the media task in a task queue and the fourth media task is immediately subsequent to the third media task in the task queue, assigning the third media task to the second thread in response to the third media task being immediately subsequent to the media task in the task queue and the third estimated completion time being after the estimated completion time and outside of a threshold of the estimated completion time, and assigning the fourth media task to the thread in response to the fourth media task being immediately subsequent to the third media task in the task queue and fourth estimated completion time being after the third estimated completion time and outside of the threshold of the third estimated completion time.

In some embodiments, assigning the media task to the thread includes receiving an indication that a latency time measure corresponding to completion of one or more second media tasks submitted for processing prior to the received media task exceeds a threshold and creating the thread in response to the latency time measure exceeding the threshold. In some embodiments, the latency time measure comprises a difference between a time of report of output media data to an application and an estimated completion time for each of the one or more second media tasks.

Processing may continue at operation 805, where, from the assigned thread, a status of the media task at the selected one of the heterogeneous hardware units is checked only after and in response to passing the estimated completion time. As discussed herein, no polling is performed and no blocking is issued prior to the passing of the estimated completion time. Therefore, the selected hardware unit and the thread are not communicatively coupled until the status check is performed. Notably, the selected hardware unit may not provide resultant output data until passing the estimated completion time and in response to the status check by the thread. In response to the status check, the thread may receive output data for the media task or an indication that the media task is incomplete. If output data is received, the thread passes the output data to the application corresponding to the media task. If an indication that the media task is incomplete, process 800 may further include providing, in response to the indication that the media task is incomplete, one of a polling inquiry or a blocking call command to the selected one of the heterogeneous hardware units. For example polling may be performed until the output data is received or a blocking call may be issued for the selected hardware unit to provide the output data upon completion of the media task.

Process 800 may be repeated any number of times either in series or in parallel for any number media tasks. As discussed, process 800 may provide for scheduling media tasks for any suitable media processing context. For example, the discussed techniques for scheduling media tasks may provide computationally efficient and low power media content processing.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. In other examples, various components of the systems or devices discussed herein may be provided in a platform as may be found in a server, computer, cloud computing resource, or the like.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the processes or any operations discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
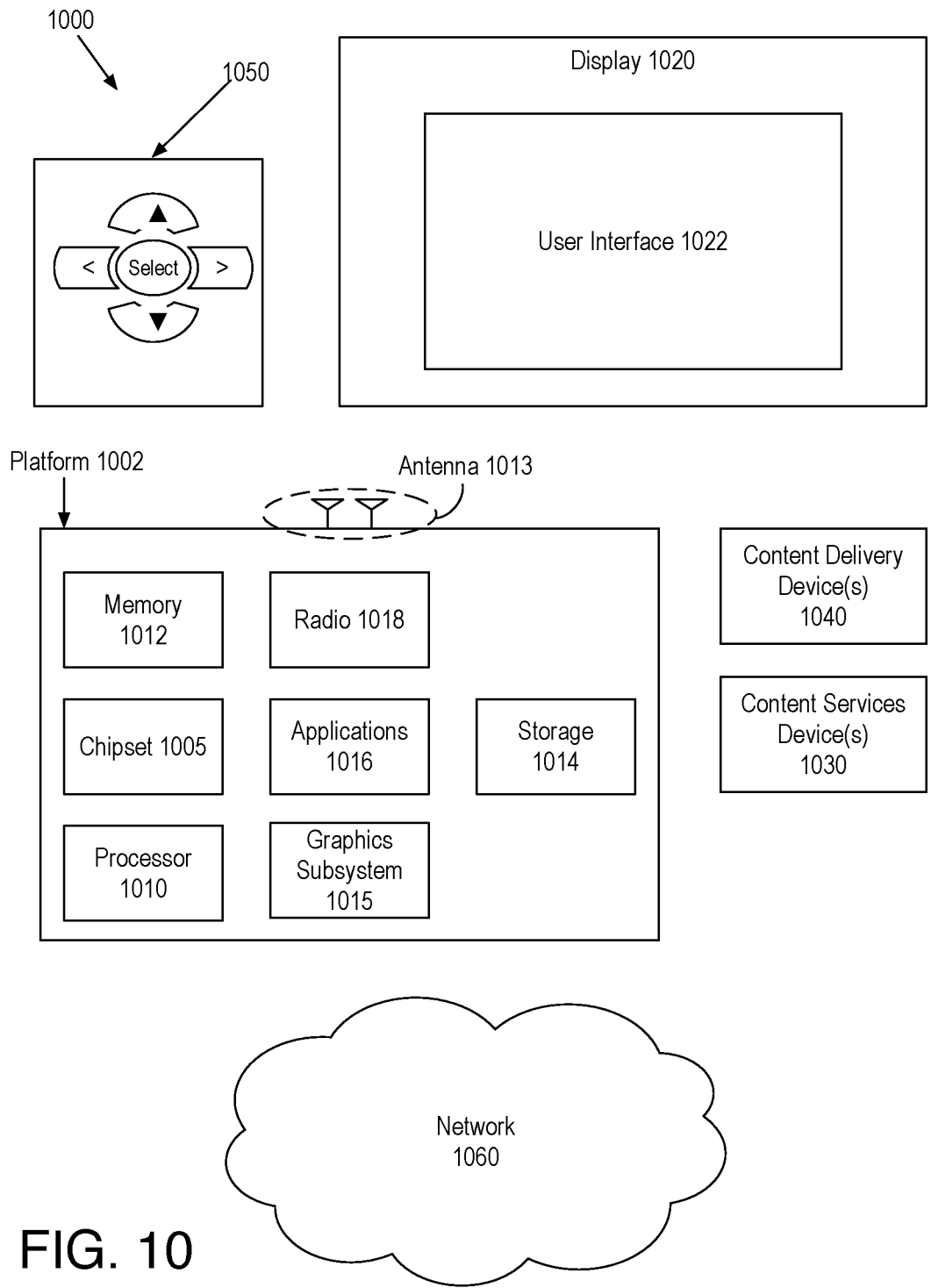
FIG. 10 is an illustrative diagram of an example system.

FIG. 10 is an illustrative diagram of an example system 1000, arranged in accordance with at least some implementations of the present disclosure. In various implementations, system 1000 may be a mobile device or a server device although system 1000 is not limited to this context. For example, system 1000 may be incorporated into a server system, cloud computing resource, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, camera, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
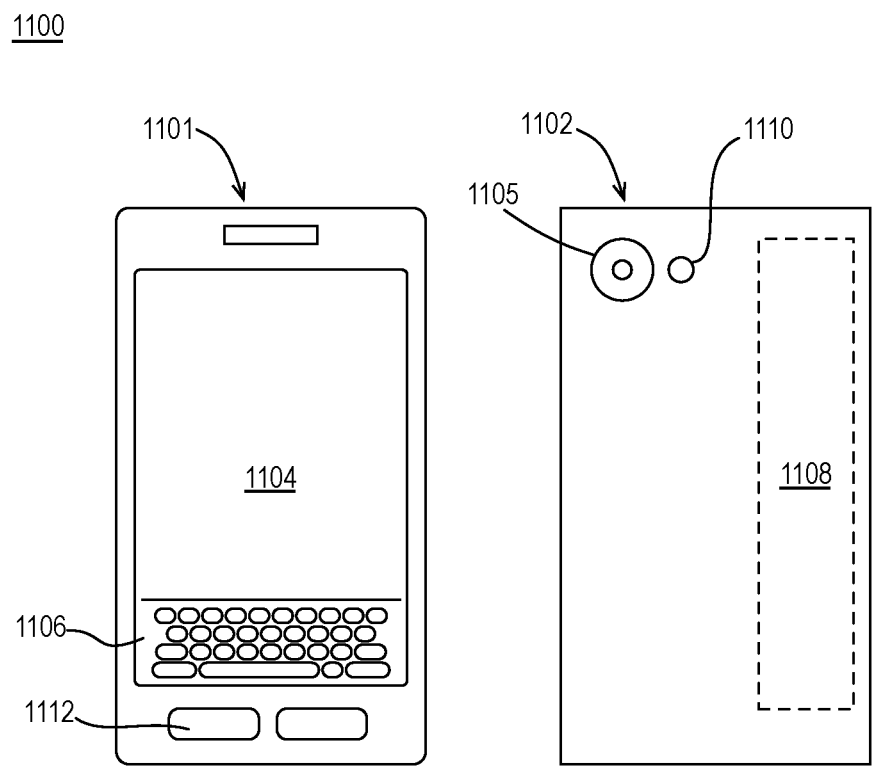
FIG. 11 illustrates an example device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, system 100 or any other systems, devices, or operations discussed herein may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for scheduling media tasks comprises determining an estimated duration for processing a received media task at each of a plurality of heterogeneous hardware units, submitting the media task for processing to a selected one of the heterogeneous hardware units based on the estimated durations, determining an estimated completion time for the media task based on adding the estimated duration corresponding to the selected one of the heterogeneous hardware units to a start time corresponding to the media task submission, assigning the media task to a thread for management of the media task, and checking, from the assigned thread, a status of the media task at the selected one of the heterogeneous hardware units only after and in response to passing the estimated completion time.

In one or more second embodiments, further to the first embodiments, assigning the media task to the thread comprises determining the estimated completion time for the media task is within a threshold of a second estimated completion time for a second media task assigned to a second thread and creating the thread in response to the estimated completion time being within the threshold of the second estimated completion time.

In one or more third embodiments, further to the first or second embodiments, assigning the media task to the thread comprises determining the estimated completion time for the media task matches a second estimated completion time for a second media task and assigned to a second thread and creating the thread in response to the estimated completion time being within the threshold of the second estimated completion time.

In one or more fourth embodiments, further to any of the first through third embodiments, the method further comprises determining a third estimated completion time for a third media task is after the estimated completion time and a fourth estimated completion time for a fourth media task is after the third estimated completion time, wherein the third media task is immediately subsequent to the media task in a task queue and the fourth media task is immediately subsequent to the third media task in the task queue, assigning the third media task to the second thread in response to the third media task being immediately subsequent to the media task in the task queue and the third estimated completion time being after the estimated completion time and outside of a threshold of the estimated completion time, and assigning the fourth media task to the thread in response to the fourth media task being immediately subsequent to the third media task in the task queue and fourth estimated completion time being after the third estimated completion time and outside of the threshold of the third estimated completion time.

In one or more fifth embodiments, further to any of the first through fourth embodiments, assigning the media task to the thread comprises receiving an indication that a latency time measure corresponding to completion of one or more second media tasks submitted for processing prior to the received media task exceeds a threshold and creating the thread in response to the latency time measure exceeding the threshold.

In one or more sixth embodiments, further to any of the first through fifth embodiments, the latency time measure comprises a difference between a time of report of output media data to an application and an estimated completion time for each of the one or more second media tasks.

In one or more seventh embodiments, further to any of the first through sixth embodiments, determining the estimated durations is based on a task description corresponding to the media task and, for each of the plurality of heterogeneous hardware units, a priori reference data corresponding to the task description.

In one or more eighth embodiments, further to any of the first through seventh embodiments, determining the estimated durations comprises determining a previous execution time for processing a second media task having the same type as the media task at the selected one of the heterogeneous hardware units and setting the estimated duration for the selected one of the heterogeneous hardware units based at least in part on the previous execution time.

In one or more ninth embodiments, further to any of the first through eighth embodiments, determining the estimated durations comprises performing look ahead processing on the media task to generate one or more look ahead processing parameters for the media task, wherein the look ahead processing performs the same task as the media task with one or more differing processing characteristics and setting the estimated duration based at least in part on the look ahead processing parameters.

In one or more tenth embodiments, further to any of the first through ninth embodiments, the method further comprises receiving, in response to the status check from the assigned thread, an indication that the media task is incomplete and providing, in response to the indication that the media task is incomplete, one of a polling inquiry or a blocking call command to the selected one of the heterogeneous hardware units.

In one or more eleventh embodiments, further to any of the first through tenth embodiments, submitting the media task for processing to the selected one of the heterogeneous hardware units comprises selecting the selected one of the heterogeneous hardware units in response to the selected one of the heterogeneous hardware units having a minimum estimated duration of the estimated durations.

In one or more twelfth embodiments, further to any of the first through eleventh embodiments, the media task comprises one of a frame encode, a frame decode, a motion vector search, a color conversion, a denoise, a color adjustment, or a frame resizing, and the heterogeneous hardware units comprise each of a graphics processing unit, a fixed function hardware block, an execution unit, and a system on a chip.

In one or more thirteenth embodiments, a device or system includes a memory and one or more processors to perform a method according to any one of the above embodiments.

In one or more fourteenth embodiments, at least one non-transitory machine readable medium includes a plurality of instructions that in response to being executed on a computing device, cause the computing device to perform a method according to any one of the above embodiments.

In one or more fifteenth embodiments, an apparatus may include means for performing a method according to any one of the above embodiments.

It will be recognized that the embodiments are not limited to the embodiments so described, but can be practiced with modification and alteration without departing from the scope of the appended. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system to schedule media tasks, the system comprising:
   a memory to store a media task;
   machine-readable instructions; and
   at least one programmable circuit to be programmed based on the machine-readable instructions to:
   determine estimated durations to respectively process the media task at corresponding ones of a plurality of heterogeneous hardware units;
   submit the media task to a selected one of the heterogeneous hardware units based on the estimated durations;
   determine an estimated completion time for the media task based on addition of the estimated duration corresponding to the selected one of the heterogeneous hardware units to a start time corresponding to submission of the media task;
   assign the media task to a thread, the thread to manage the media task; and
   obtain, from the thread, a status of the media task at the selected one of the heterogeneous hardware units after, but not before, the estimated completion time has passed.

2. The system of claim 1, wherein the media task is a first media task, the estimated completion time is a first estimated completion time, and one or more of the at least one programmable circuit is to:
   determine the first estimated completion time for the first media task is within a threshold of a second estimated completion time for a second media task; and
   create the thread based on the first estimated completion time being within the threshold of the second estimated completion time.

3. The system of claim 1, wherein the media task is a first media task, the estimated completion time is a first estimated completion time, and one or more of the at least one programmable circuit to:
   determine the first estimated completion time for the first media task corresponds to a second estimated completion time for a second media task; and
   create the thread based on the first estimated completion time corresponding to the second estimated completion time.

4. The system of claim 2, wherein the media task is a first media task, the estimated completion time is a first estimated completion time, the thread is a first thread, the second media task is assigned to a second thread, and one or more of the at least one programmable circuit is further to:
   determine a third estimated completion time for a third media task is after the first estimated completion time, and determine a fourth estimated completion time for a fourth media task is after the third estimated completion time, the third media task subsequent to the first media task in a task queue and the fourth media task subsequent to the third media task in the task queue;
   assign the third media task to the second thread based on the third media task being subsequent to the first media task in the task queue and the third estimated completion time being after the first estimated completion time and outside the threshold of the first estimated completion time; and
   assign the fourth media task to the first thread based on the fourth media task being subsequent to the third media task in the task queue and the fourth estimated completion time being after the third estimated completion time and outside the threshold of the third estimated completion time.

5. The system of claim 1, wherein the media task is a first media task, and one or more of the at least one programmable circuit is to:
   obtain an indication that a latency time measure corresponding to completion of one or more second media tasks submitted to one or more of the heterogeneous hardware units prior to the submission of the first media task exceeds a threshold; and
   create the thread based on the latency time measure exceeding the threshold.

6. The system of claim 5, wherein the estimated completion time is a first estimated completion time, and the latency time measure is based on a difference between a time of report of output media data to an application and a second estimated completion time for at least one of the one or more second media tasks.

7. The system of claim 1, wherein one or more of the at least one programmable circuit is to determine the estimated durations based on a task description corresponding to the media task and based on, for ones of the plurality of heterogeneous hardware units, respective a priori reference data corresponding to the task description.

8. The system of claim 1, wherein the media task is a first media task, and one or more of the at least one programmable circuit is to:
   determine a previous execution duration to process a second media task having a same type as the first media task at the selected one of the heterogeneous hardware units; and
   set the estimated duration for the selected one of the heterogeneous hardware units based at least in part on the previous execution duration.

9. The system of claim 1, wherein one or more of the at least one programmable circuit is to:
   perform look ahead processing on the media task to generate one or more look ahead processing parameters for the media task, the look ahead processing to perform a same task as the media task with one or more differing processing characteristics; and
   set the estimated duration based at least in part on the look ahead processing parameters.

10. The system of claim 1, wherein one or more of the at least one programmable circuit is to:
    after the status is obtained from the thread, obtain an indication that the media task is incomplete; and
    provide, after the indication that the media task is incomplete, at least one of a polling inquiry or a blocking call command to the selected one of the heterogeneous hardware units.

11. The system of claim 1, wherein one or more of the at least one programmable circuit is to select the selected one of the heterogeneous hardware units based on the selected one of the heterogeneous hardware units having a minimum estimated duration of the estimated durations.

12. The system of claim 1, wherein the media task includes at least one of a frame encode, a frame decode, a motion vector search, a color conversion, a denoise, a color adjustment, or a frame resizing, and the heterogeneous hardware units include at least one of a graphics processing unit, a fixed function hardware block, an execution unit, or a system on a chip.

13. A method to schedule media tasks, the method comprising:
    determining estimated durations to respectively process a media task at corresponding ones of a plurality of heterogeneous hardware units;
    submitting the media task to a selected one of the heterogeneous hardware units based on the estimated durations;
    determining an estimated completion time for the media task based on adding the estimated duration corresponding to the selected one of the heterogeneous hardware units to a start time corresponding to submission of the media task;
    assigning the media task to a thread, the thread to manage the media task; and
    obtaining, from the thread, a status of the media task at the selected one of the heterogeneous hardware units after, but not before, the estimated completion time.

14. The method of claim 13, wherein the media task is a first media task, the estimated completion time is a first estimated completion time, and the assigning of the first media task to the thread includes:
    determining the first estimated completion time for the first media task corresponds to a second estimated completion time for a second media task; and
    creating the thread based on the first estimated completion time being within a threshold of the second estimated completion time.

15. The method of claim 13, wherein the media task is a first media task, and the assigning of the media task to the thread includes:
    obtaining an indication that a latency time measure corresponding to completion of one or more second media tasks submitted to one or more of the heterogeneous hardware units prior to the submission of the first media task exceeds a threshold; and
    creating the thread based on the latency time measure exceeding the threshold.

16. The method of claim 13, wherein the media task is a first media task, and the determining of the estimated durations includes:
    determining a previous execution duration to process a second media task having a same type as the first media task at the selected one of the heterogeneous hardware units; and
    setting the estimated duration for the selected one of the heterogeneous hardware units based at least in part on the previous execution duration.

17. The method of claim 13, wherein the determining of the estimated durations includes:
    performing look ahead processing on the media task to generate one or more look ahead processing parameters for the media task, the look ahead processing performing a same task as the media task with one or more differing processing characteristics; and
    setting the estimated duration based at least in part on the look ahead processing parameters.

18. At least one memory comprising instructions to cause at least one programmable circuit to at least:
    determine estimated durations to respectively process a media task at corresponding ones of a plurality of heterogeneous hardware units;
    submit the media task a selected one of the heterogeneous hardware units based on the estimated durations;
    determine an estimated completion time for the media task based on addition of the estimated duration corresponding to the selected one of the heterogeneous hardware units to a start time corresponding to submission of the media task;
    assign the media task to a thread, the thread to manage the media task; and
    obtain, from the thread, a status of the media task at the selected one of the heterogeneous hardware units after, but not before, the estimated completion time has passed.

19. The at least one memory of claim 18, wherein the media task is a first media task, the estimated completion time is a first estimated completion time, and the instructions are to cause one or more of the at least one programmable circuit to:
    determine the first estimated completion time for the first media task corresponds to a second estimated completion time for a second media task; and create the thread based on the first estimated completion time being within a threshold of the second estimated completion time.

20. The at least one memory of claim 18, wherein the media task is a first media task, the estimated completion time is a first estimated completion time, and the instructions are to cause one or more of the at least one programmable circuit to:
   obtain an indication that a latency time measure corresponding to completion of one or more second media tasks submitted to one or more of the heterogeneous hardware units prior to the submission of the first media task exceeds a threshold; and
   create the thread based on the latency time measure exceeding the threshold.

21. The at least one memory of claim 18, wherein the media task is a first media task, and the instructions are to cause one or more of the at least one programmable circuit to:
   determine a previous execution duration to process a second media task having a same type as the first media task at the selected one of the heterogeneous hardware units; and
   set the estimated duration for the selected one of the heterogeneous hardware units based at least in part on the previous execution duration.

\* \* \* \* \*